United States Patent [19]

Buford

[11] Patent Number: 4,946,631
[45] Date of Patent: Aug. 7, 1990

[54] CARBURETOR

[75] Inventor: Charles G. Buford, Oceanside, Calif.

[73] Assignee: Crown Carburetor Co., Ltd., Arcadia, Calif.

[21] Appl. No.: 280,716

[22] Filed: Dec. 6, 1988

[51] Int. Cl.[5] ............................................. F02M 7/28
[52] U.S. Cl. .......................... 261/39.5; 261/DIG. 56; 261/64.2; 261/121.4; 261/44.5; 261/52
[58] Field of Search ............. 261/50.2, DIG. 56, 64.2, 261/121.4, 39.5, 44.5, 52

[56] References Cited

U.S. PATENT DOCUMENTS

| | | | |
|---|---|---|---|
| 1,000,054 | 8/1911 | Ulrich | 261/64.2 |
| 1,078,592 | 11/1913 | Muir | 261/64.2 |
| 1,253,577 | 1/1918 | Costa | 261/50.2 |
| 1,275,032 | 8/1918 | Huene | 261/64.2 |
| 1,616,726 | 2/1927 | Wilcox . | |
| 1,733,367 | 10/1929 | Dickerson | 261/121.4 |
| 1,733,668 | 10/1929 | Leibing | 261/DIG. 56 |
| 1,735,499 | 11/1929 | Girin | 261/64.2 |
| 1,927,090 | 9/1933 | Hess . | |
| 2,118,038 | 5/1938 | Broderson et al. | 261/44.5 |
| 2,152,057 | 3/1939 | Killmeyer . | |
| 2,208,317 | 7/1940 | Beck | 261/121.4 |
| 2,225,261 | 12/1940 | Jorgensen . | |
| 2,541,316 | 2/1951 | Winkler . | |
| 2,793,634 | 5/1957 | Ericson | 261/64.2 |
| 2,833,261 | 5/1958 | August . | |
| 2,868,185 | 1/1959 | Bellicardi . | |
| 2,925,257 | 2/1960 | Cohn | 261/44.6 |
| 3,023,745 | 3/1962 | Bames . | |
| 3,039,485 | 6/1962 | Brohl . | |
| 3,059,909 | 10/1962 | Wise . | |
| 3,078,078 | 2/1963 | Carlson | 261/121.4 |
| 3,249,344 | 5/1966 | Smith . | |
| 3,249,345 | 5/1966 | Gast . | |
| 3,266,785 | 8/1966 | Kennedy, Sr. . | |
| 3,275,306 | 9/1966 | Phillips . | |
| 3,278,171 | 10/1966 | Carlson . | |
| 3,284,063 | 11/1966 | Bickhaus et al. | 261/50.2 |
| 3,322,408 | 5/1967 | Stoltman | 261/50.2 |
| 3,350,073 | 10/1967 | Hill . | |
| 3,365,179 | 1/1968 | LaForce . | |
| 3,493,217 | 2/1970 | Farley | 261/121.4 |
| 3,592,449 | 7/1971 | Elgohary | 261/50.2 |

(List continued on next page.)

FOREIGN PATENT DOCUMENTS

| | | |
|---|---|---|
| 2559157 | 7/1984 | Fed. Rep. of Germany . |
| 123360 | 2/1919 | United Kingdom . |
| 2034823 | 6/1980 | United Kingdom ............. 261/121.4 |

OTHER PUBLICATIONS

Ford Motorcraft Carburetors pp. 2-332, FIG. 5.
GM Delco/Rochester Carburetors, p. 346, FIG. 2.
Holley Carburetors, pp. 2-378, FIGS. 2 and 3.

Primary Examiner—Tim Miles
Attorney, Agent, or Firm—William P. Green

[57] ABSTRACT

A carburetor including a throttle valve for regulating the flow of air through the body of the carburetor and to an engine, with fuel being introduced into the air flow for intermixture therewith, and with the device including an air actuated element which is preferably located downstream of the throttle valve and is adapted to be displaced automatically by the air to different positions varying in correspondence with the rate of air flow through the device, and which forms a restriction varying in size with the rate of air flow and acting to enhance dispersal of the fuel within the air and assure intimate intermixture of the air and fuel for optimum functioning of the engine. The fuel may be premixed with a secondary flow of air before delivery of the fuel and secondary air as a combined stream into the primary flow of air, and the combined stream may be drawn by vacuum into the primary flow of air at the location of the restriction formed by the flow actuated member. Precise control of the amount of fuel which is fed into the primary flow is attained by automatic regulation of a valve controlling the amount of secondary air which is mixed with the fuel. A proper air-fuel ratio may be assured by utilizing movement of the air actuated element to control operation of the secondary air valve. Additional automatic controls for starting and idle purposes are actuated by a vacuum responsive element and a thermostatic element.

87 Claims, 12 Drawing Sheets

U.S. PATENT DOCUMENTS

| | | |
|---|---|---|
| 3,664,648 | 5/1972 | Seeley, Jr. . |
| 3,667,739 | 6/1972 | Menke . |
| 3,701,513 | 10/1972 | Carter . |
| 3,746,321 | 7/1973 | De Pontac .......................... 261/121.4 |
| 3,880,963 | 4/1975 | Bier et al. ........................... 261/121.4 |
| 3,885,545 | 5/1975 | Charron et al. . |
| 3,906,912 | 9/1975 | Jackson et al. . |
| 3,917,760 | 11/1975 | Swatman . |
| 3,933,952 | 1/1976 | Elmore . |
| 3,937,768 | 2/1976 | Bier et al. .................... 261/DIG. 56 |
| 3,957,930 | 5/1976 | Birmingham . |
| 3,962,379 | 6/1976 | Freismuth et al. . |
| 3,965,221 | 6/1976 | Englert et al. . |
| 4,007,721 | 2/1977 | Regueiro ........................... 261/121.4 |
| 4,078,024 | 3/1978 | Bockelmann et al. . |
| 4,097,562 | 6/1978 | Blakeway . |
| 4,123,479 | 10/1978 | Andreassen . |
| 4,132,203 | 1/1979 | Elpern et al. . |
| 4,132,752 | 1/1979 | Petermann ........................ 261/121.4 |
| 4,137,284 | 1/1979 | Barbee . |
| 4,139,581 | 2/1979 | Swanson ........................... 261/121.4 |
| 4,141,940 | 2/1979 | Dye . |
| 4,198,358 | 4/1980 | Mineck .............................. 261/50.2 |
| 4,206,735 | 6/1980 | Miles et al. . |
| 4,207,274 | 6/1980 | Phillips . |
| 4,224,904 | 9/1980 | Clerk . |
| 4,250,856 | 2/1981 | Abbey ................................ 261/64.2 |
| 4,275,017 | 6/1981 | Rollins .............................. 261/121.4 |
| 4,276,238 | 6/1981 | Yoshikawa et al. ............. 261/121.4 |
| 4,279,841 | 7/1981 | Stettner ............................. 261/121.4 |
| 4,298,549 | 11/1981 | Woodworth . |
| 4,313,411 | 2/1982 | Moriyama et al. . |
| 4,335,693 | 6/1982 | Cowles .............................. 261/50.2 |
| 4,393,012 | 7/1983 | Kato et al. ........................ 261/121.4 |
| 4,396,558 | 8/1983 | Bruning . |
| 4,434,110 | 2/1984 | Highfield . |
| 4,505,864 | 3/1985 | Chang ............................... 261/121.4 |
| 4,515,734 | 5/1985 | Rock et al. . |
| 4,541,384 | 9/1985 | Nakazato ........................ 261/121.4 |
| 4,670,194 | 6/1987 | Buford et al. . |

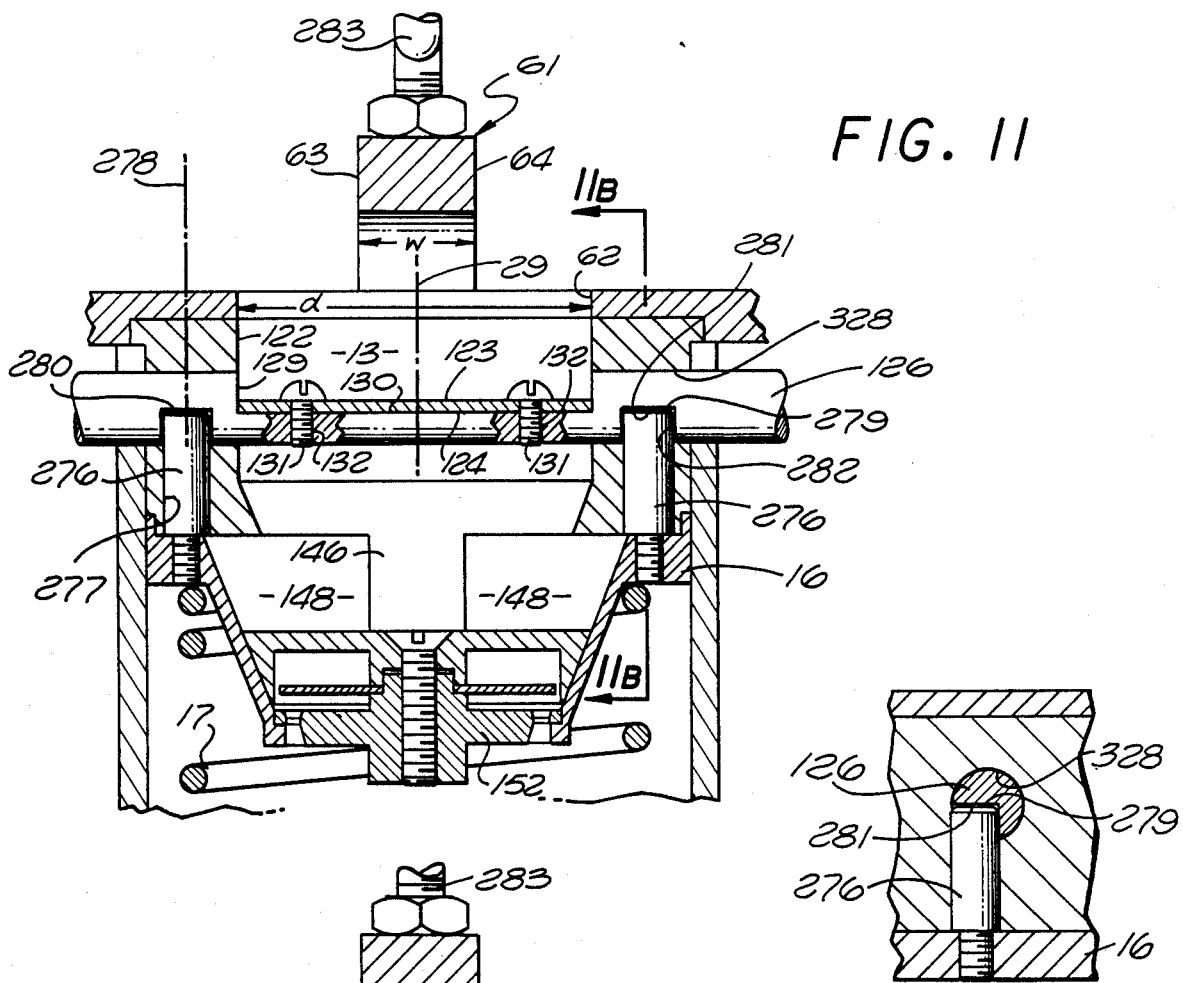
FIG. 11
FIG. 11B
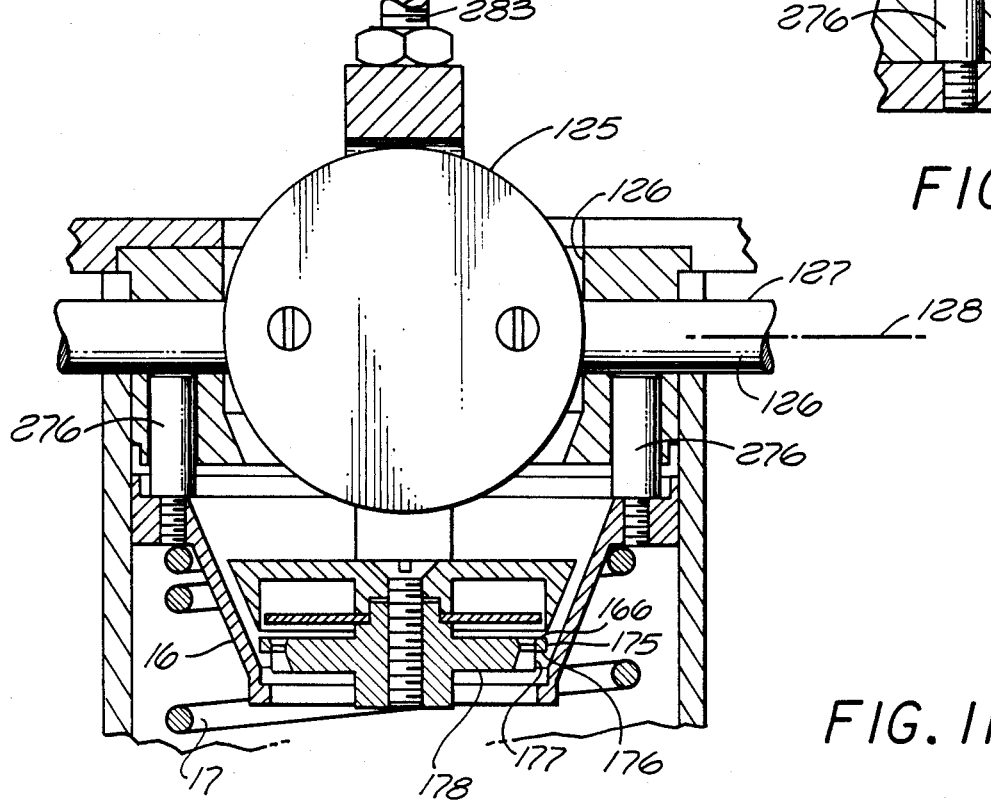
FIG. 11A

CARBURETOR

This invention relates to improved carburetors for delivering an air-fuel mixture to an internal combustion engine or other fuel burning unit.

BACKGROUND OF THE INVENTION

Numerous different types of carburetors have been devised in the past with the intention of attaining an intimate intermixture of fuel and air in proper proportions under all of the different operating conditions which may be encountered in the use of an internal combustion engine. The great variety of conditions which may be met in operation of an engine has made it very difficult to meet all of those conditions and requirements in a single carburetor structure. As a result, the carburetors actually in use today are very complex and include many different mechanisms and different fuel and air circuits each designed to serve a particular specialized purpose in an attempt to produce together the desired overall optimum functioning of the engine. Further, even with all of this complication, modern day carburetors produce only a very crudely controlled mixture which is far from ideal under most operating conditions and which drastically limits the mileage attainable by an associated engine. In addition, these carburetors are very difficult and expensive to maintain and repair, and produce excessive air pollution by incomplete combustion of the fuel.

Some prior carburetors, such as for example that shown in U.S. Pat. No. 4,207,274, have included air actuated elements which are positioned along the path of air through the device and are displaced by the air to different positions varying in accordance with the rate of air flow past the element. In that patent, the movement of such an air actuated element regulates a needle valve which controls the rate of delivery of fuel into the air stream. The intermixed fuel and air then flow past a throttle valve which is controlled by the operator to regulate the amount of air and fuel drawn to the associated engine.

SUMMARY OF THE INVENTION

A carburetor embodying the present invention preferably includes an air actuated element which is so located and constructed as to assist in finely atomizing and volatilizing the fuel in the primary flow of air and then delivering the intimately intermixed air and fuel to the engine without recondensation on cold metal parts, and particularly on or near the throttle of the device. To avoid condensation of fuel on the throttle, the air actuated element is desirably located downstream of the throttle, rather than upstream as in the above mentioned patent. Preferably, the fuel is also introduced into the primary flow of air downstream of the throttle, and for best results is delivered into that primary flow near the location of a restriction which is formed by the air actuated element and at which the air travels at very high velocity. A secondary flow of air may be mixed with the fuel before delivery of the fuel and secondary air as a combined stream into the primary air. That combined stream of fuel and secondary air may be divided into a series of spaced jets at or near the location of the restriction, with those jets being directed through diverging nozzles which may be open at one side adjacent the primary air flow path.

A further feature of the invention resides in a unique arrangement for accurately regulating the amount of fuel which is delivered into the primary flow of air through the carburetor. In lieu of the usual needle valves or other similar valving elements for directly metering the flow of liquid fuel into an air stream, the present invention preferably meters the fuel indirectly but with increased precision by controllably varying the amount of secondary air which is premixed with the fuel before delivery of that secondary air and fuel together into the primary flow of air. The secondary air and fuel are drawn by engine vacuum into the primary flow of air in a relation enabling regulation of the secondary air to control inversely the amount of fuel which is drawn into the carburetor. When an increased amount of fuel is required for operation of the engine, the increased fuel flow is attained by restricting the secondary air and thereby increasing the vacuum applied to the fuel to deliver an enriched mixture of fuel and secondary air into the primary flow of air. For best results, the secondary flow of air is controlled by a valve which is operated automatically in accordance with movement of the previously mentioned air actuated element, so that when that element is displaced by air flowing therepast the secondary air valve is moved to a more closed position resulting in increased fuel delivery to the engine.

During starting of the engine, the amount of secondary air which is premixed with the fuel is reduced under the control of a vacuum actuated unit, to thereby increase the amount of fuel delivered with the secondary air into the primary flow of air and thereby produce an enriched mixture for starting the engine. As soon as the engine starts, the engine vacuum actuates an auxiliary valve to increase the amount of secondary air which is delivered to and premixed with the fuel. This auxiliary valve may also be actuable by a thermostatic element to enrich the airfuel mixture when the engine is cold. Additionally, the thermostatic element preferably functions to deliver increased air to the system downstream of the throttle valve under cold start conditions.

In order to allow clearing of the carburetor of excessive fuel and vapors to relieve a flooded condition, the invention provides means for mechanically opening the normally closed air actuated element. This may be attained by means of an operative connection between the throttle valve and the air actuated element, which connection moves the air actuated element in an opening direction in response to opening movement of the throttle valve and independently of the normal displacement of the air actuated element by the primary flow of air through the device.

BRIEF DESCRIPTION OF THE DRAWINGS

The above and other features and objects of the invention will be better understood from the following detailed description of the typical embodiments illustrated in the accompanying drawings, in which:

FIG. 11 is a fragmentary vertical section taken on line 11—11 of FIG. 4;

FIG. 11A is a view similar to FIG. 11 but showing the throttle in fully open condition when the engine is not operating;

FIG. 11B is a fragmentary transverse section taken on line 11B—11B of FIG. 11;

DESCRIPTION OF THE PREFERRED EMBODIMENTS

Figure 1:
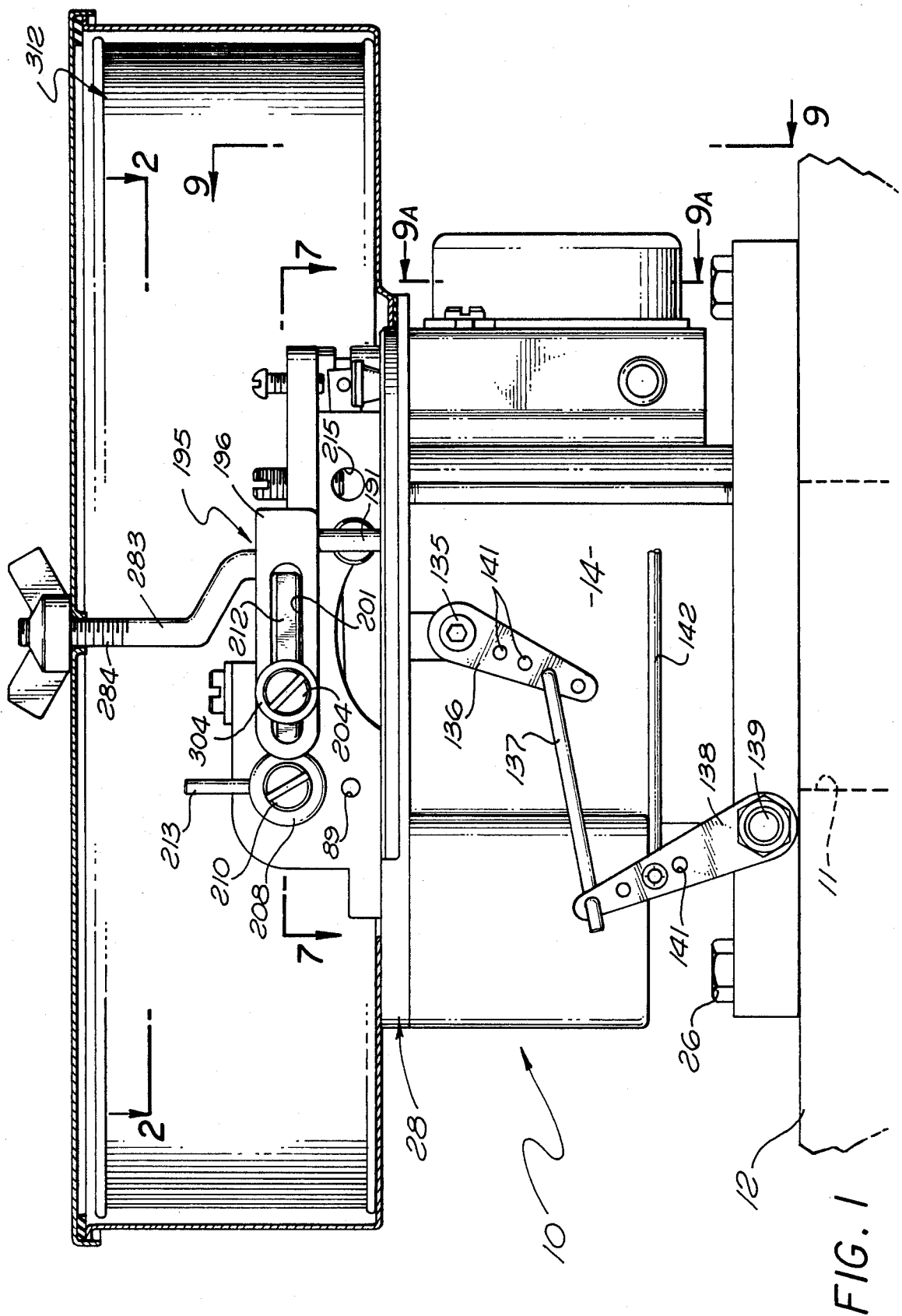
FIG. 1 is a side view of a carburetor embodying the invention.

Referring first to FIGS. 1 through 4, there is illustrated at 10 a carburetor constructed in accordance with the invention and which functions to deliver an air-fuel mixture to the fuel and air intake passage 11 of an internal combustion engine whose intake manifold structure is typically represented at 12. The usual air cleaner 312 is connected to the upper side of the carburetor for filtering air delivered into the upper end of the primary air flow passage 13 of the carburetor. The body 14 of the carburetor is formed sectionally of a number of parts which will be described in greater detail at a later point. The speed at which the engine operates is controlled by varying the rate at which the primary air flows downwardly within passage 13 in the body structure, and the rate of air flow is in turn controlled by butterfly type throttle valve 15. An air actuated part 16 is displaced downwardly against the force of a spring 17 and relative to a stationary assembly 18 in the body structure, with this downward displacement of part 16 being produced by the air flow through the device and being essentially proportional to the rate of primary air flow. Fuel is supplied from a float chamber 19 and is premixed with secondary air from several sources including a rotary valve 20, with the combined stream of fuel and secondary air flowing through passage 21 in structure 18 to emit downwardly therefrom near the restriction 22 (FIG. 5) between the lower portions of part 16 and structure 18 to mix with the primary air and be delivered with it to the engine.

The body 14 includes a horizontal bottom plate 23 having a planar horizontal undersurface 24 resting on a horizontal planar upper surface 25 of the intake manifold 12 and secured thereto by screws 26 extending downwardly through openings 27 in plate 24 and connecting threadedly into the manifold. Openings 27 are formed in the corner portions of the preferably square bottom plate 23, and are located and spaced in a manner allowing the carburetor to be attached to the intake manifold 12 in any of four different orientations, so that accelerator mechanisms and other controls and related parts may be connected to the carburetor at different sides as required for the various different types of engines currently on the market. Desirably, there are two of the openings 27 provided in each of the corners, in the pattern illustrated, to give the carburetor maximum applicability to different engines.

Figure 2:
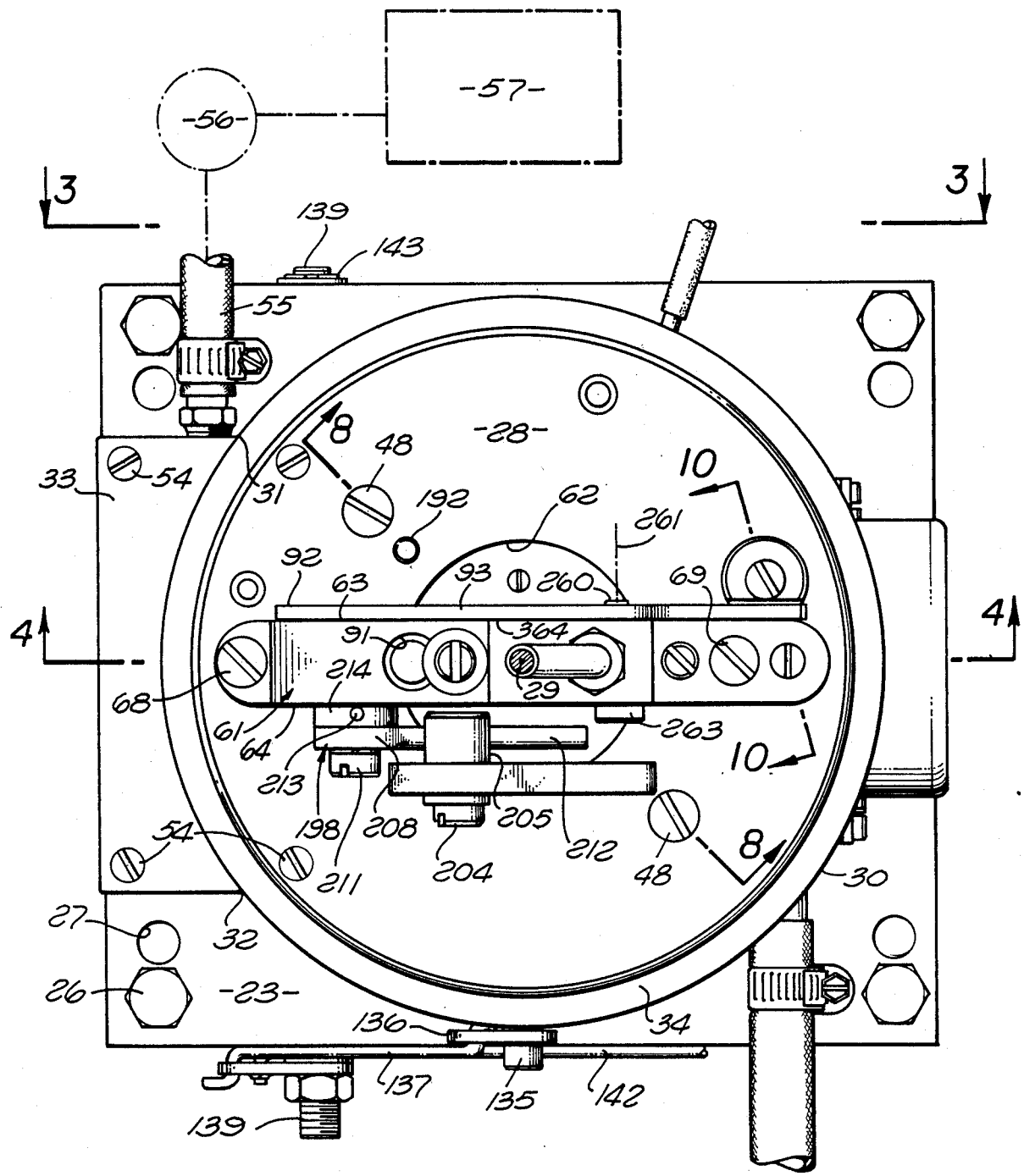
FIG. 2 is a top plan view of the carburetor, taken on line 2—2 of FIG. 1.
Figure 4:
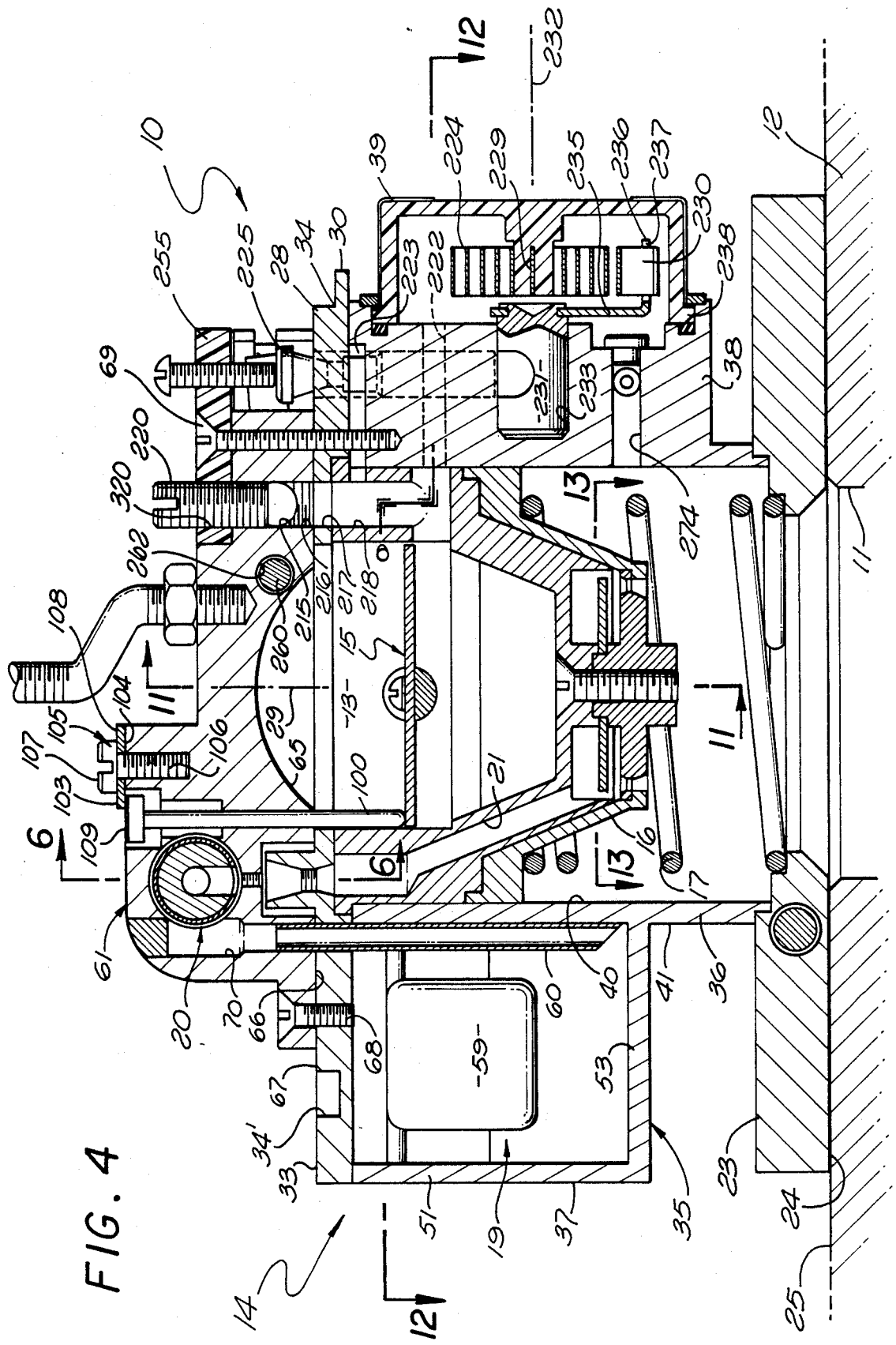
FIG. 4 is an enlarged vertical section taken on line 4—4 of FIG. 2.
Figure 5:
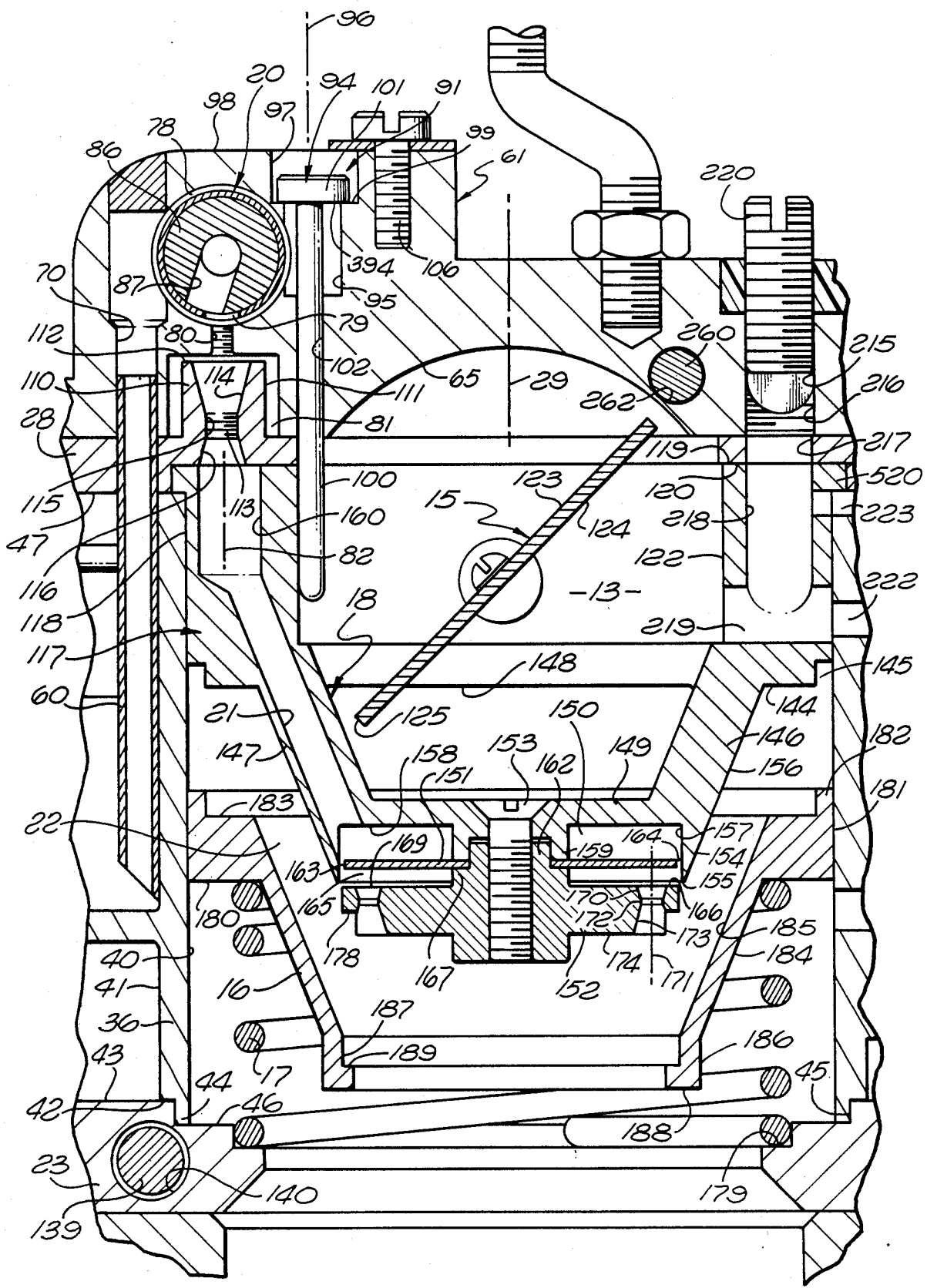
FIG. 5 is a further enlarged view corresponding to a portion of FIG. 4 but showing the throttle and air actuated element in partially open condition.

At a level spaced above bottom plate 23, body structure 14 of the carburetor includes a horizontal top plate 28 which is essentially circular about a vertical central axis 29 of the device as seen in FIG. 2. The horizontal outline configuration of top plate 28 may be described as being defined by a peripheral edge 30 of the plate which extends circularly about axis 29 in a clockwise direction from the location 31 of FIG. 2, and continues circularly at a uniform diameter with respect to axis 29 through more than 270 degrees to the location 32. At its left side as viewed in FIGS. 1 and 2, top plate 28 has a generally rectangular projection 33 forming the top wall of float chamber 19. Adjacent its peripheral edge 30, top plate 28 has an annular recess 34 which receives and supports the air cleaner 35. At the location of the rectangular portion 33 of the top plate, recess 34 continues as a groove 34', as seen in FIG. 4.

Figure 8:
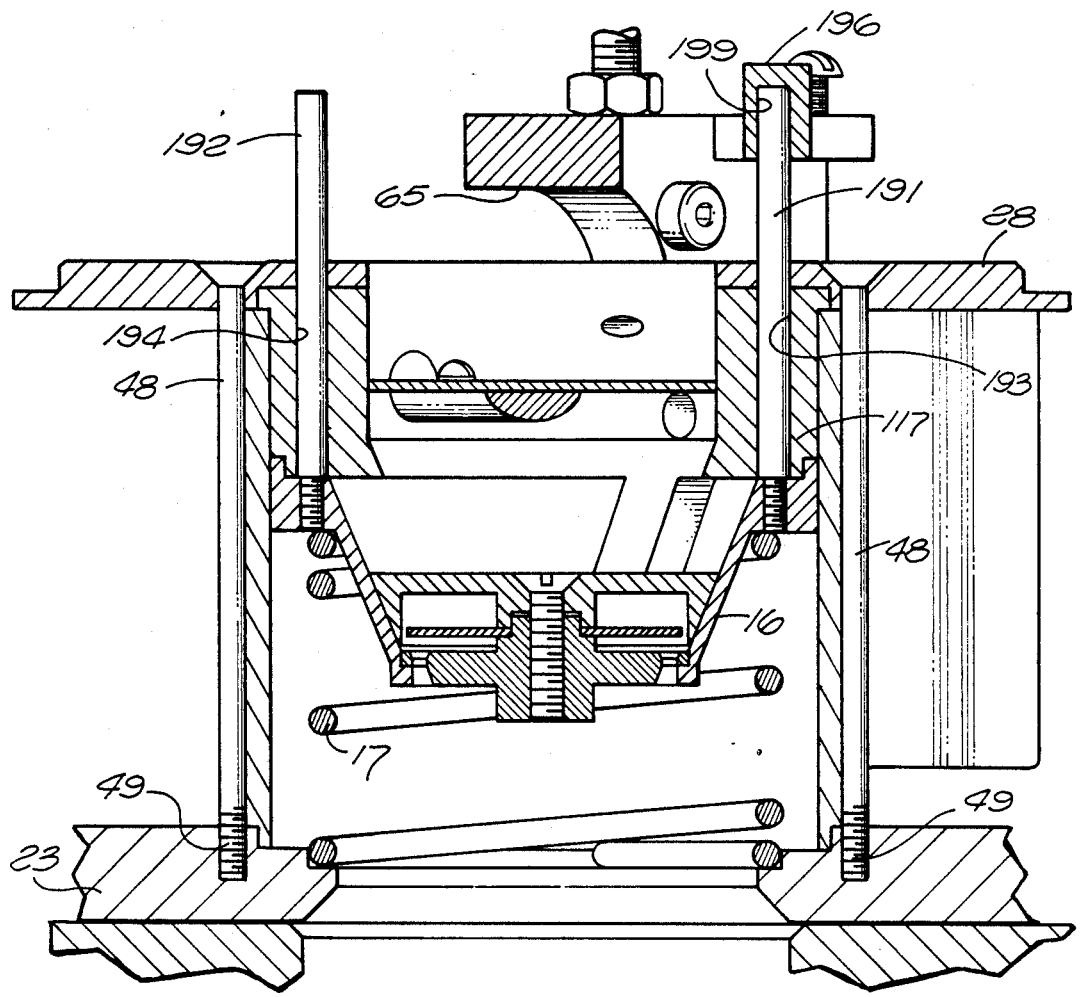
FIG. 8 is a vertical section taken on line 8—8 of FIG. 2.

Vertically between bottom plate 23 and top plate 28, the body structure 14 of the carburetor includes a housing part 35 having a central portion 36 forming a main cylindrical barrel or tube centered about vertical axis 29 and containing the primary vertical air flow passage 13 of the device. At its left side as seen in FIG. 4, the housing part has a portion 37 containing and forming float chamber 19, and at its right side as viewed in FIG. 4 the housing part 35 has a portion 38 carrying a thermostatic cold start control unit 39. The three portions 36, 37 and 38 of housing part 35 may all be molded integrally as a one piece structure, preferably being formed of an appropriate rigid resinous plastic material such as nylon to have a low thermal conductivity minimizing transission of heat to the fuel and thereby reducing the possibility of vapor lock. The central tubular portion 36 of part 35 has an inner cylindrical surface 40 and an outer cylindrical surface 41, both centered about vertical axis 29. At its lower end, portion 36 of part 35 has an annular horizontal shoulder 42 (FIG. 5) bearing downwardly against the upper horizontal planar surface 43 of bottom plate 23, and has an annular portion 44 projecting downwardly within and centered by a surface 45 of plate 23 and bearing downwardly at its lower end against a horizontal surface 46 of plate 23. At its upper end, the cylindrical portion 36 of part 35 bears upwardly against the horizontal undersurface of an annular flange 520 of a part 117 which will be described in greater detail at a later point. Two elongated vertical screws 48 (FIGS. 2 and 8) extend downwardly through openings in top plate 28 at diametrically opposite sides of axis 29, and beyond plate 28 project downwardly at opposite sides of central tubular portion 36 of part 35, and connect threadedly at their lower ends 49 into bottom plate 23, to clamp portion 36 of part 35 tightly between the top and bottom plates and thus maintain parts 23, 117, 28 and 35 together as a unitary rigid body structure.

Figure 12:
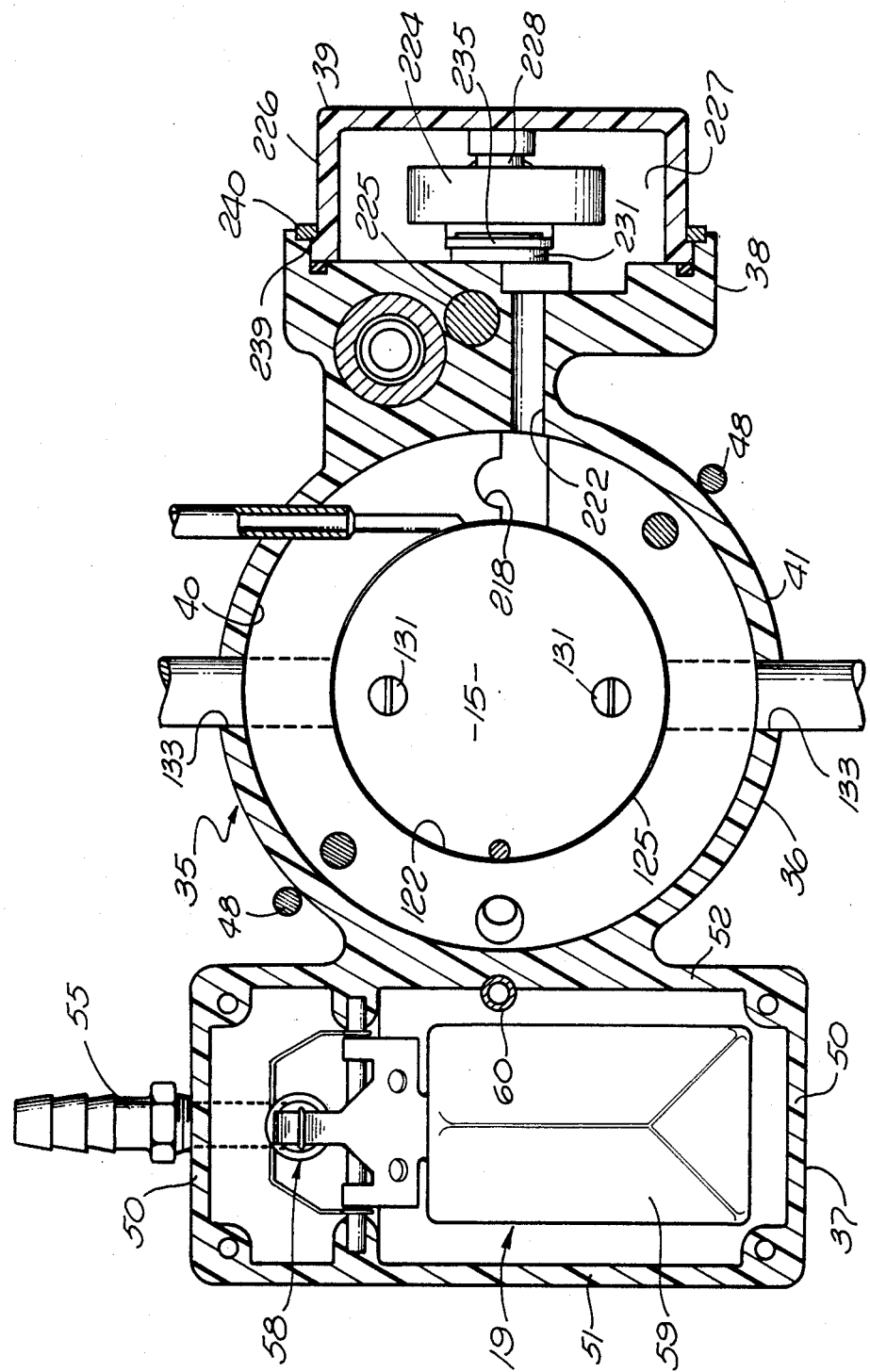
FIG. 12 is a horizontal section taken on line 12—12 of FIG. 4.
Figure 13:
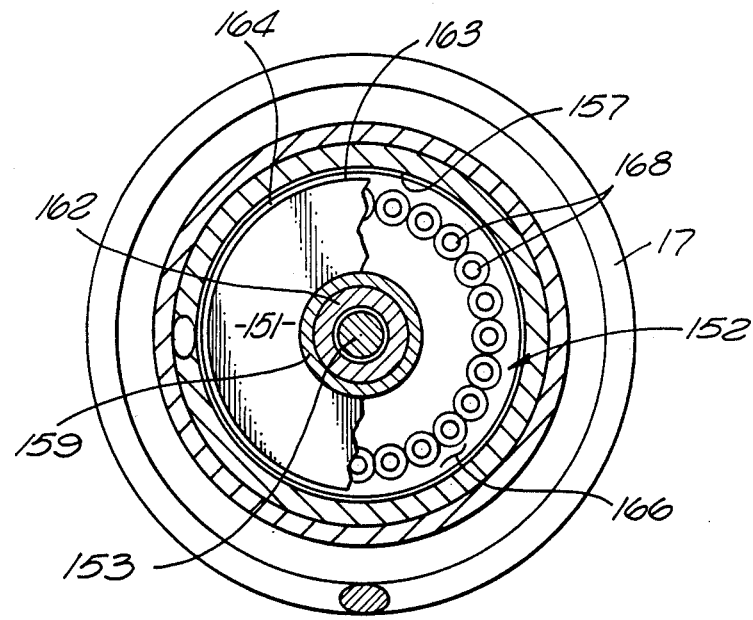
FIG. 13 is a horizontal section taken on line 13—13 of FIG. 4.

The portion 37 of housing part 35 forms the float chamber 19 which is typically essentially rectangular in horizontal section as seen in FIG. 12, and may be considered as defined by two opposite vertical side walls 50, an outer vertical wall 51, an inner vertical wall 52 merging with a portion of the central barrel 36, and a horizontal bottom wall 53. The upper side of chamber 19 is closed by portion 33 of top plate 28, and is secured thereto by four screws 54 extending downwardly through openings in the top plate and connected threadedly into portion 37 of part 35 in a relation forming a fluid tight seal between parts 28 and 35 about the periphery of the upper portion of chamber 19. Fuel is admitted into chamber 19 through an inlet 55 supplied by a fuel pump 56 taking suction from a fuel tank 57. The fuel is maintained at a desired level within chamber 19 in conventional manner by a float valve represented at 58 and controlled by the usual float 59. The carburetor draws fuel by suction from float chamber 19 through a tube 60 (FIG. 5) whose lower end is open to receive fuel from the chamber and whose upper end projects upwardly through an opening in top plate 28.

At the upper side of top plate 28, the body assembly 14 of the carburetor includes a fuel control block 61 which extends diametrically across the upper side of a central circular opening 62 formed in top plate 28 and centered about axis 29. As seen in FIGS. 2 and 11, block 61 is defined at its opposite sides by two parallel vertical planar side surfaces 63 and 64 extending parallel to and spaced equal distances from axis 29, with the width w of block 61 between surfaces 63 and 64 being substantially less than the diameter d of opening 62 to leave portions of that opening at opposite sides of block 61 open for relatively free flow of incoming air into opening 62 and the primary air flow passage 13. To further facilitate induction of air into the upper side of the carburetor, block 61 may contain a recess at its underside defined by a surface 65 (FIG. 4) which is vertically opposite the upper end of primary air flow passage 13 and is curved cylindrically about the horizontal pivotal axis 128 of throttle 15 at a diameter to be closely proximate but avoid contact with the periheral edge of the throttle as it swings to an open position. At the right and left side of surface 65 as viewed in FIG. 4, block 61 has aligned planar horizontal undersurfaces 66 engaging downwardly against the upper surface 67 of top plate 28. Block 61 is secured rigidly to top plate 28 and the remainder of body assembly 14 by two screws 68 and 69 extending downwardly through openings in end flanges of the block. Screw 68 connects threadedly into plate 28, and screw 69 extends downwardly through an opening in plate 28 and connects threadedly into portion 38 of main housing part 35.

Figure 6:
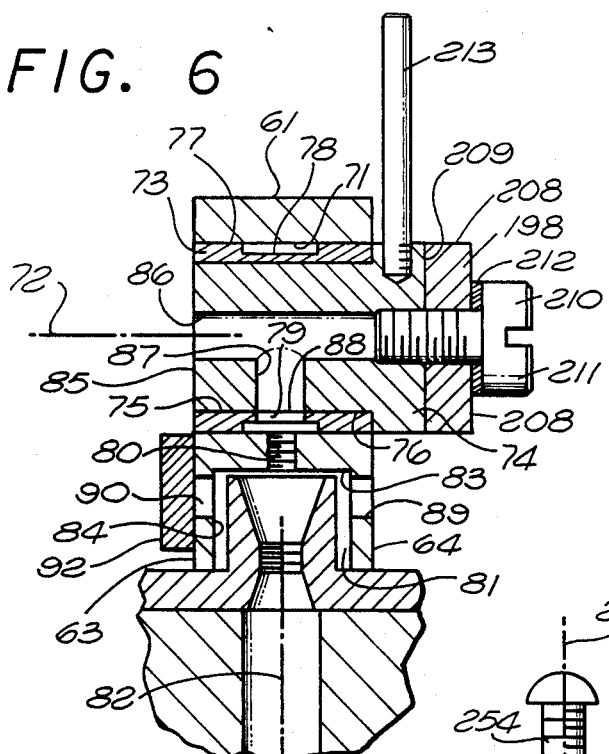
FIG. 6 is an enlarged fragmentary vertical section taken on line 6—6 of FIG. 4.
Figure 7:
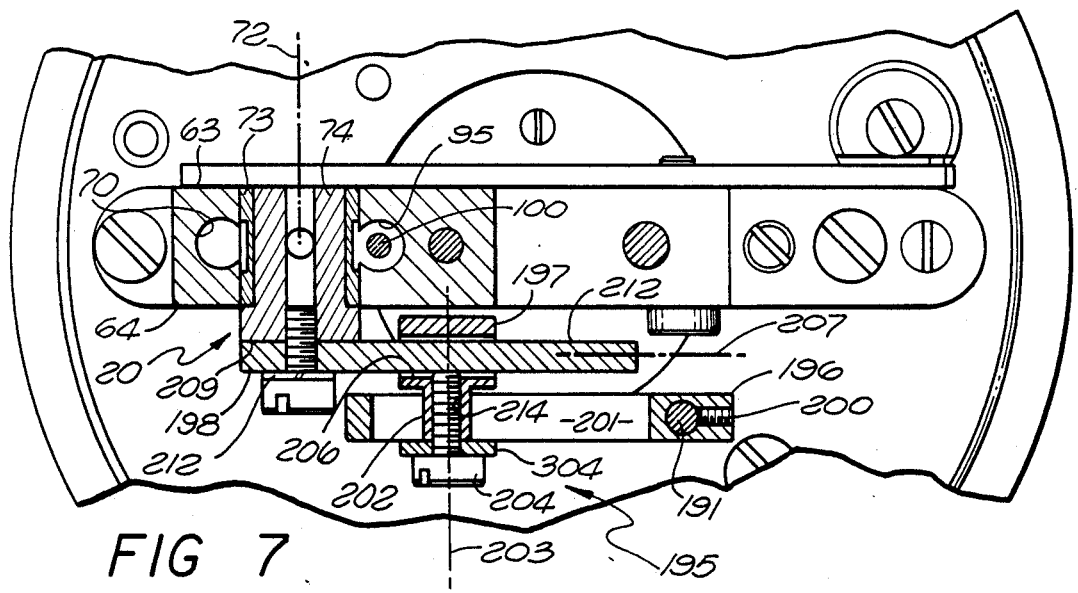
FIG. 7 is a fragmentary horizontal section taken on line 7—7 of FIG. 1.

Vertical fuel feed tube 60 projects downwardly from a vertical passage 70 in fuel block 61 into float chamber 19, to deliver fuel through passage 70 to rotary valve 20. The rotary valve assembly 20 is contained within a cylindrical passage 71 (FIG. 6) which is formed in block 61 and extends between its opposite side surfaces 63 and 64 and is centered about a horizontal axis 72 perpendicular to surfaces 63 and 64. Fuel passage 70 extends generally tangentially with respect to cylindrical valve passage 71 and intersects that passage at a location midway between surfaces 63 and 64 to open into and deliver fuel into passage 71 and the rotary valve assembly (FIG. 7).

Rotary valve assembly 20 includes a tubular sleeve 73 and a rotary valve element 74 contained within the sleeve. Sleeve 73 has an inner cylindrical surface 75 centered about axis 72 and engaging a correspondingly dimensioned external cylindrical surface 76 on valve element 74 to mount element 74 for rotation about axis 72 relative to the sleeve. The sleeve extends between the planes of opposite side surfaces 63 and 64 of block 61, and is rigidly secured in fixed position within bore or passage 71, as by having its external cylindrical surfaces 77 dimensioned to be a press fit within passage 71. At an axially central location, between the two surfaces 77, sleeve 73 has an external annular groove 78 which communicates with passage 70 to receive fuel therefrom and deliver that fuel downwardly along an arcuate path within groove 78 to a location directly beneath a preferably circular opening 79 formed in the central lower portion of the sleeve. From that location, the fuel is drawn downwardly by high velocity air through a vertical passage 80 within block 61 to a chamber 81 formed in the underside of that block. Passage 80 is desirably of essentially circular horizontal section, and both opening 79 and passage 80 are centered about a vertical axis 82 intersecting the main rotary axis 72 of valve assembly 20 at a location midway between surfaces 63 and 64. Chamber 81 may be defined by a horizontal circular top wall 83 and a cylindrical vertical side wall 84 centered about axis 82. The short vertical passage 80 between the rotary valve and chamber 81 has a fine screw thread formed in its side wall, with that screw thread being centered about axis 82 and acting as a series of irregularities functioning to attain an initial dispersion of the fuel into air being intermixed therewith, to break up or atomize the fuel to a finely divided form as it enters chamber 81.

The rotary valve element 74 has a planar end surface 85 lying in the same plane as side surface 63 of the fuel control block 61. A secondary air inlet passage 86 is formed within valve element 74, extending from its end surface 85 to a point of communication with a passage 87 extending radially outwardly (downwardly in FIG. 6) to an opening 88 formed in outer surface 76 of element 74. This opening 88 is desirably circular and of a diameter larger than opening 79 in sleeve 78. In the FIG. 4 setting rotary valve 74 relative to sleeve 73, passage 87 and opening 88 in the valve element are directly opposite and communicate fully with opening 79 in the sleeve, to deliver a secondary flow of air freely to opening 79 from secondary air inlet 86 in element 74. When valve element 74 is rotated slightly from the FIG. 4 position as to the position of FIG. 5, opening 88 moves progressively out of registry with opening 79, to progressively close off the flow of secondary air from inlet 86. The restriction of the secondary air causes a corresponding increase in the suction which is applied to the fuel in groove 78, and thus increases the amount of fuel delivered through passage 80, chamber 81, and passage 21 into the primary flow of air within main passage 13. In any setting of valve element 74, the very high velocity of the secondary air which is drawn downwardly from passage 76 acts in conjunction with the thread irregularities in the side wall of passage 80 to provide virtually complete initial intermixture of the fuel and air entering chamber 81.

Three additional sources of secondary air to be admixed with the fuel are provided by two air inlets 89 and 90 formed in opposite sides of block 61, and an air inlet 91 formed in the upper side of block 61. Inlet 89 forms an opening in vertical side surface 64 of block 61, and extends inwardly through the block into communication with chamber 81. This inlet may be continuously open, to provide for admission of some secondary air into admixture with the fuel even when rotary valve 20 and the other valves are completely closed. Inlet 90 forms a circular opening in the opposite planar side surface 63 of block 61, and extends inwardly from the plane of that surface to communicate with chamber 81. The flow of secondary air into the device through opening 90 is controlled by a swinging valve plate 92 carried by a pivoting lever 93 operating automatically in response to changes in vacuum and temperature conditions.

Inlet 91 supplies secondary air to the fuel only under idle conditions, and is closed off automatically by a valve element 94 when throttle 15 is opened to increase the speed of the engine above idle. Valve 94 thus enriches the airfuel mixture to give added power and avoid any tendency for stalling upon initial acceleration of the engine. Inlet 91 is formed as a vertical cylindrical passage 95 formed within block 61 along a vertical axis 96, and having an enlarged diameter vertical cylindrical side wall 97 formed as a counterbore at the upper end of the inlet adjacent top planar surface 98 of the block. An annular horizontal shoulder 99 is formed at the juncture of the two different diameter portions 95 and 97 of the passage. The main cylindrical portion 95 of inlet 91 is essentially tangential with respect to cylindrical passage 71 within which the rotary valve assembly is received, and intersects with and opens into passage 71 at a location midway between surfaces 63 and 64 and diametrically opposite the point at which fuel passage 70 opens into passage 71. The air from inlet 91 thus enters groove 78 in sleeve 73, and flows downwardly and arcuately within that groove to the location of passage 80 in block 61, to flow downwardly therethrough in admixture with the fuel and the secondary air from valve element 74.

Valve element 94 may take the form of a headed pin, having a vertical cylindrical shank 100 extending along axis 96 and carrying enlarged diameter cylindrical head 101 at its upper end also centered about axis 96. Shank 100 is closely slidably received within a bore 102 formed in block 61 beneath passage 95, and is guided thereby for vertical movement along axis 96 between the positions of FIGS. 4 and 5. The cylindrical head 101 of valve element 94 has an external diameter less than the diameter of cylindrical counterbore surface 97 formed in block 61, so that in the FIG. 4 idling position of element 94 secondary air can flow downwardly past the outside of head 94 and then radially inwardly at its underside, beneath the annular horizontal undersurface 394 of the head and surface 99 of the block, to enter passage 95 and flow downwardly therethrough into groove 78. Element 94 is retained in this upper open position by engagement with a peripheral portion of throttle 15 in the FIG. 4 idle condition. If the throttle is pivoted in a counterclockwise direction from the FIG. 4 position toward the FIG. 5 position, the periphery of the throttle at its left edge as viewed in FIG. 4 moves downwardly away from the lower end of valve element 94, permitting element 94 to fall downwardly by gravity to the FIG. 5 position in which its annular undersurface 394 engages surface 99 of the block to prevent further admission of secondary air to the fuel through passage 95. This reduction in the amount of secondary air causes application of increased vacuum to the fuel in passage 70, resulting in an increase in fuel delivery to attain the desired increase in power.

Element 94 also serves a secondary function of limiting closing movement of throttle 15 to determine its fully closed position. For this purpose, a circular washer 103 extends partially across the upper side of counterbore 97, to limit upward movement of element 94 in the FIG. 4 condition in which throttle 15 is closed. Washer 103 is of conventional flat construction, having a planar undersurface 104 which is tightened downwardly against the upper horizontal surface 98 of block 61 by a screw 105 having a shank 106 extending downwardly through the central opening in washer 103 and connected threadedly into block 61. Head 107 of the screw is tightened downwardly against the upper horizontal surface 108 of the washer. In the FIG. 4 condition of the parts, the upper horizontal surface 109 of valve element 94 is engageable against the protruding portion of horizontal undersurface 104 of washer 103, to positively prevent upward movement of element 94 beyond the FIG. 4 position, and thereby positively prevent further pivotal movement of throttle 15 beyond its FIG. 4 setting.

To attain a second diffusion of the fuel within the secondary air, plate 28 is provided at its upper side with a tubular projection 110 extending upwardly into chamber 81. This projection has an outer cylindrical surface 111 centered about axis 82 and spaced from the cylindrical side wall 84 of chamber 81, and terminates upwardly in an annular edge 112 spaced beneath the top wall 83 of chamber 81. Directly beneath passage 80, tubular projection 110 contains an air and fuel diffusing and intermixing passage 113 having a frustroconically tapering first portion 114 centered about axis 82 and merging into a generally cylindrical portion 115 also centered about that axis. Beneath the generally cylindrical portion 115, passage 113 has a frustroconically flaring lower portion 116 centered about axis 82. The passage 113 thus functions as a venturi, acting to increase the rate of air and fuel flow at the minimum location 115. To enhance dispersal of the fuel in the secondary air, the generally cylindrical wall at the location 115 is provided with a fine screw thread whose irregularities engage the fuel and divide it into a finely atomized form dispersed within the air in a manner similar to that discussed in connection with the threads in passage 80. Air from the two inlets 89 and 90 at the opposite sides of block 61 enters chamber 81 at a level beneath the upper end 112 of tubular projection 110 of plate 28, and flows upwardly a short distance and then radially inwardly past the upper end 112 of the tubular projection toward axis 82 to flow downwardly with the other secondary air and fuel through the venturi.

The unit 18 within the upper interior of tubular portion 36 of body structure 14 contains and mounts throttle 15 and also acts as a stationary assembly relative to which air actuated part 16 moves downwardly under the influence of the primary flow of air through the device. Unit 18 directs the intermixed secondary air and fuel through passage 21 for emission downwardly from the unit 18, and for additional dispersion into the rapidly moving primary air flowing in restricted fashion between the lower ends of unit 18 and element 16.

Unit 18 includes the member 117, which has an upper portion with an external cylindrical surface 118 fitting closely within the upper end of portion 36 of body 14. At its upper end, member 117 has an annular horizontal upwardly facing surface 119 which is engageable with a downwardly facing horizontal surface 120 of plate 28. The annular flange 520 on member 117 projects a short distance radially outwardly to a location vertically between surface 120 and an upwardly facing annular horizontal end surface of tubular portion 36 of part 35 in a relation clamping member 117 rigidly in place by attachment of the top plate 28 to housing part 35. Internally, member 117 has near its upper end an inner cylindrical surface 122 centered about axis 29 and within which throttle 15 is received. As seen in FIGS. 11 and 12, the throttle is a flat butterfly type disc defined by parallel planar opposite side surfaces 123 and 124, with the disc having a circular external edge 125 of a diameter very slightly less than that of surface 122 to be a close fit therein in the closed horizontal position of FIG. 4. The throttle valve disc is carried by a shaft 126 having an external cylindrical surface 127 centered about an axis 128 intersecting and extending perpendicular to axis 29. The shaft is received within cylindrical bearing openings 328 formed in opposite sides of the upper portion of member 117, to journal the shaft and carried throttle disc 15 for rotation about axis 128. At its center, the shaft has a recessed region 129 having a planar surface 130 against which throttle 15 is retained by screws 131 extending through openings in the throttle and connected threadedly into the shaft at 132. At the outside of member 117, the opposite ends of shaft 126 extend through slots or openings 133 formed at diametrically opposite locations in the upper edge portion of the tubular barrel 36, with the extremities of the shaft at its opposite ends containing threaded bores 134 into which screws 135 can be connected for securing an actuating arm 136 rigidly to either end of the shaft. Arm 136 is connected by a link 137 to a second arm 138 which is rigidly attached by a nut 238 to a threaded end 239 of a shaft 139 extending through a passage 140 formed in bottom plate 23. The threaded end 239 of shaft 139 may project beyond nut 238 to enable threaded attachment of the shaft to any of various different types of acceleration mechanisms.

Link 137 can be connected to any of different openings 141 in arms 136 and 138, to connect pivotally to each of those arms in known manner. The arm 138 is actuated by a control mechanism typically represented at 142, which may for example be actuated by the accelerator pedal of an automobile in which the carburetor and engine are installed, to allow an operator to regulate the setting of the throttle and the speed of operation of the engine at will. Arms 136 and 138 can be attached to shafts 135 and 139 respectively at either of their ends, in order to be operable by accelerator mechanisms positioned at different sides of the carburetor in different vehicles. Shaft 139 is long enough to extend entirely through the width of bottom plate 123, and project from its opposite side, and be retained against removal by insertion of a spring clip 143 into a groove formed in the extremity of the shaft. To change the side at which the accelerator mechanism can be connected, clip 143 is removed from the shaft, to enable shaft 139 to be withdrawn horizontally from one side and then inserted into the other side and retained in that position by reattachment of the clip. Arm 136 is changed to the opposite side by removing screw 135 and connecting it and the arm 136 to the opposite end of the throttle shaft 126.

At a level beneath that of throttle 15, member 117 has a downwardly facing horizontal annular surface 144, with an annular peripheral recess 145 being formed along the outer edge of surface 144. Projecting downwardly and inwardly beyond the level of surface 144, member 117 has two similar web portions 146 and 147, with air passing openings 148 formed circularly therebetween. Webs 146 and 147 carry at their lower ends a circular bottom portion 149 disposed transversly of axis 29 and containing a circular recess 150 within which a diffusing disc 151 is located, with that disc and a diffusing plate 152 being retained by a screw 153. Externally, the bottom portion 149 of member 117 has an outer surface 154 which tapers frustroconically downwardly about axis 29 to a lower annular edge 155 of the part. The radially outer surfaces 156 of web portions 146 and 147 form upper continuations of the frustroconically tapering surface 154. Recess 150 in the underside of portion 149 of member 117 is defined by a cylindrical inner surface 157 centered about axis 29, and a horizontal surface 158 perpendicular to axis 29. Screw 153 extends through a central cylindrical boss 159 formed in the recess. Passage 21 which conducts the intermixed fuel and secondary air in isolation from the primary flow of air within passage 13 and for ultimate mixture with that primary air has an upper vertical cylindrical portion 160 receiving the intermixed secondary air and fuel from diffusing venturi passage 113, and extends downwardly and inwardly as shown in FIG. 4 and through web portion 147 of member 117 to enter annular recess 150 in the bottom of member 117.

Disc 151, which is spaced downwardly beneath the top wall 158 of recess 115 by engagement against boss 159 of member 117, extends horizontally and is annular and received about an upper circular projection 162 formed at the upper side of plate 152. Between the projection 162 and the outer circular edge 163 of disc 151, the disc is imperforate. Edge 163 is circular about axis 29 and is spaced radially a short distance from side wall 157 of the recess at 164, to require flow of the secondary air and intermixed fuel through that narrow space at the periphery of disc 151 in passing to plate 152. At the underside of disc 151, the intermixed fuel and secondary air may flow radially inwardly into an annular space 165 formed between the bottom horizontal surface of disc 151 and an upper annular horizontal surface 166 of plate 152. The disc is spaced upwardly above surface 166 by engagement with an elevated annular surface 167 on bottom plate 152, the inner edge of the plate being clamped between members 117 and 152 by tightening of screw 153.

The secondary air and fuel flow downwardly from annular space 165 through a series of evenly circularly spaced venturi passages 168 formed in bottom plate 152 near its periphery. Each of these passages 168 forms at its upper end a circular entrance opening 169 through which secondary air and fuel can enter the passage to flow downwardly therethrough. From that opening 169, each passage may first taper at 170 about a vertical axis 171 to a reduced diameter, then extend cylindrically at a uniform diameter about axis 171 for a short distance as represented at 172, and then flare downwardly and frustroconically about axis 171 through a substantial distance at 173 to the level of a bottom horizontal surface 174 of plate 152. Externally, plate 52 in extending downwardly beneath the level of its upper surface 166 may have a short vertical cylindrical surface 175 (FIG. 11A), at the lower end of which plate 152 may reduce in diameter, having a horizontal undersurface 176 preferably at the level of the restricted portion 172 of each of the venturi passages, with the outer surface of plate 52 then extending cylindrically downwardly at 177 to the level of a horizontal undersurface 178. The external cylindrical surface 177 on bottom plate 152 is at a diameter with respect to axis 29 placing that surface 177 just slightly radially outwardly beyond the restricted portions 172 of the venturi passages 168, and as a result surface 177 truncates and interrupts the flaring portions 173 of the venturi passages, leaving those flaring passages open at their radially outer sides for optimum intermixture of the secondary air and fuel with the primary flow of air moving downwardly past the outer edge of plate 152.

Flow actuated member 16 fits about member 117 of unit 18, and is displaceable downwardly relative thereto by the force of primary air traveling through the carburetor. This downward displacement of member 16 relative to unit 18 is resisted by coil spring 17, which is centered about axis 29 and extends about the main path of downward flow of air and fuel through the device, and which bears downwardly against bottom plate 23 at 179 and upwardly against a horizontal annular surface 180 of member 16. Member 16 has an external cylindrical surface 181 at its upper end of a diameter corresponding to the internal diameter of tubular portion 36 of housing part 35, and which is slidably guided by portion 136 for upward and downward movement along axis 29 to different positions such as those shown in FIGS. 4 and 5. An upwardly projecting annular flange or rim 182 on member 16 extends upwardly into the recess 145 at the exterior of member 117 in the FIG. 4 closed position of the air flow actuated member 16. In that position, horizontal annular surface 183 of member 16 bears upwardly against surface 144 of member 117. Projecting downwardly from its upper portion, flow actuated member 16 has a frustroconically tapering annular portion 184 with an internal surface 185 tapering in correspondence with external surfaces 154 and 156 of member 117, to fit closely about and engage those surfaces 154 and 156 in the FIG. 4 position of member 16. At its lower end, member 16 has a cylindrical portion 186 which has an inner cylindrical surface 187 fitting closely about and slidably engaging the external cylindrical surface 175 of member 152 of unit 18. An annular horizontal flange 188 projects radially inwardly a short distance toward axis 29 at the lower extremity of cylindrical portion 186, and has an upper cylindrical surface 189 engaging the undersurface 178 of bottom plate 152 in the FIG. 4 position. Member 16 is imperforate from its upper edge to its lower edge and about its entire circular extent, to prevent flow of any primary air downwardly past member 16 in the closed position of that member. As member 16 is moved downwardly by vacuum upon opening of throttle 15, the primary flow of air from above member 16 flows downwardly through the generally annular restriction 22 radially between the lower portions of member 16 and unit 18. The air and fuel within venturi passages 168 is exposed to this high velocity downwardly moving restricted primary air, and is intimately intermixed therewith by virtue of that velocity and the close proximity of the air and fuel passages. Surface 189 enhances the action by deflecting the air from gap 22 radially inwardly toward and into the flaring portions 173 of venturi passages 168.

Flow actuated member 16 is further guided for axial movement along axis 29 by two similar cylindrical guide rods 191 and 192 (FIG. 8) which are attached rigidly at their lower ends to member 16 by threaded connection into member 16. Rods 191 and 192 project upwardly parallel to and at diametrically opposite sides of axis 29, and extend through and are close fits within axial passages 193 and 194 in member 117 and top plate 28 to guide member 16 for the desired only vertical movement. Member 16 is operatively connected to secondary air valve element 74 by a mechanism 195, to automatically progressively close that secondary air valve in response to primary air flow induced movement of member 16, to thus increase the delivery of fuel in proportion to the increase in air flow. Mechanism 195 includes a first connector part 196 attached to rod 191 which moves with member 16, a second connector part 197 slidably engaging part 196, and a third connector part 198 which carries part 197. For attachment to rod 191, part 196 contains a vertical recess 199 (FIG. 8) extending upwardly from its underside and into which the upper end of rod 191 is insertable. A set screw 200 is connected threadedly into part 196 and is tightenable against the upper end of rod 191 to secure connector part 196 rigidly to rod 191 at a location above top plate 28 and for upward and downward movement therewith. Part 196 projects generally horizontally from the upper end of rod 191, and contains a horizontally elongated slot 201 (FIG. 1) having a uniform vertical dimension along its horizontal length.

The second connector part 197 has a cylindrical portion 202 (FIG. 7) extending along and centered about a horizontal axis 203, and which is received within slot 201 in part 196. The diameter of cylindrical portion 292 of part 197 is essentially equal to the vertical dimension of slot 201, to guide portion 202 for only horizontal sliding movement within the slot. A screw 204 connects threadedly into the end of part 197, with the head of the screw retaining a washer 304 against an outer side of part 196 to hold the parts 196 and 197 in slidable engagement with one another. Inwardly of its portion 202, part 197 has an increased diameter externally cylindrical portion 205 centered about the same axis 203 as is portion 202, with portion 205 containing a cylindrical passage 206 extending along and centered about an axis 207 which is perpendicular to and intersects axis 203, so that the passage 206 extends diametrically through portion 205 of part 197.

The third connector part 198 has a circular portion 208 which is clamped against an annular surface 209 formed on an end of rotary secondary valve element 74, which surface is disposed transversely of axis 72 of the rotary valve element. Portion 208 of part 198 is clamped against surface 209 by a screw 210 (FIG. 6), whose shank connects threadedly into element 74 and whose head 211 is received at the outer side of the circular portion 208 of part 198 and is tightenable thereagainst, with a lock washer 212 received between the head of the fastener and part 198 to retain part 198 against rotation relative to valve element 74. Projecting from its portion 208, the third connector part 198 has a cylindrical rod portion 212 (FIG. 2), which is a close fit within and slidably received within passage 206 in part 197. Axis 203 of part 197 is parallel to axis 72 of the rotary valve element (FIG. 7), and the rod portion 212 of part 198 extends radially with respect to both of the axes 203 and 72. Valve element 74 is adjustable rotatively relative to part 198 by loosening screw 210 and then manually turning valve element 74 relative to part 198, after which screw 210 is tightened to retain the parts in their adjusted setting. For effecting such manual rotation of valve element 74 relative to member 198, an actuating handle 213 may be connected to an enlarged diameter flange 214 formed on element 74 adjacent side surface 64 of fuel control block 61. This handle 213 may take the form of a short typically cylindrical rod or arm connected threadedly into a bore formed in the periphery of element 74 and projecting radially outwardly therefrom perpendicular to axis 72. The screw 204 which retains parts 196 and 197 against separation also serves a second purpose of locking part 197 in any desired position along portion 212 of part 198. For this purpose, the threaded bore 214 in part 197 into which the shank of screw 204 is connected extends axially to a location of intersection with passage 206 (FIG. 7) so that the inner end of the screw can be tightened against portion 212 of part 198 to lock part 197 in fixed position on that portion 212.

When member 16 and the attached part 196 move downwardly in response to the flow of primary air through passage 13, the downward movement of part 196 causes corresponding downward movement of part 197 by virtue of its reception within slot 201, and the downward movement of part 197 causes rotary movement of member 198 about its axis 72, with corresponding rotary movement of the connected valve element 74 acting to progressively close off the flow of secondary air through the rotary valve and from its bottom opening 88. Thus, an increase in the flow of primary air through the device causes a decrease in the flow of secondary air from the rotary valve element, which increases the suction on the fuel in passage 70 and thereby increases the fuel delivered to the engine in correspondence with the increased flow of primary air. The parts thus continuously maintain a predetermined air-fuel ratio at all engine speeds. The adjustment permitted by loosening of screw 210 and rotary adjustment of valve element 74 relative to part 198 is set to attain an optimum air-fuel ratio at idle speed, and the adjustment permitted by loosening of screw 204 and adjustment of part 197 along rod 212 is effected at high speed to optimize the fuel-air ratio at that speed.

Figure 16:
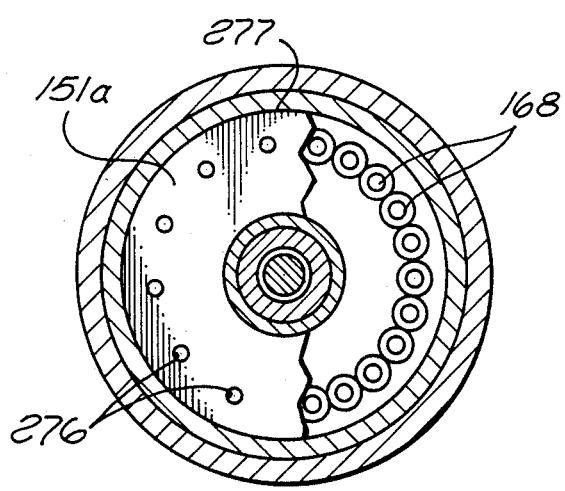
FIG. 16 is a horizontal section taken on line 16—16 of FIG. 15.

A limited flow of primary air is delivered to the engine under idle conditions from an inlet passage 215 (FIG. 5) which is formed within fuel control block 61, and extends horizontally inwardly from side surface 64 of that block to communicate with a vertical bore 216 in the block. From bore 216, the idle air flows downwardly through two vertical cylindrical passages 217 and 218 in top plate 28 and member 117 respectively, and then flows inwardly through a horizontal passage 219 to deliver the air into the portion of primary air flow passage 13 which is located beneath throttle 15 and within member 117. The idle air can then flow downwardly past part 16 under the influence of the engine vacuum, opening part 16 slightly against the resistance of spring 17 (see FIG. 16). The amount of inlet air which enters the engine in this way is manually adjustable, to determine the idling speed of the engine, by adjustment of a screw 220 which is connected threadedly into the upper end of passage 216 above the location of passage 215, and which has a screwdriver slot or other tool engaging configuration at its upper end. When the screw 220 is adjusted downwardly, its lower end partially covers passage 215 as illustrated in FIGS. 1 and 4, to controllably restrict the effective size of the idle inlet passage and thereby determine the amount of air which is delivered to the engine downstream of the closed throttle when the engine is operated at idle speed. To retain idle speed adjustment screw 220 in any position to which it may be set, that screw may extend through and tightly engage a threaded bore 320 in a member 255, which is secured to the upper side of block 61 by screw 69 and is formed of nylon or other material capable of frictionally holding the screw in any set position.

The portion 38 of housing part 35 which projects to the right of primary air flow barrel 36 in FIGS. 1 and 4 contains two additional passages 222 and 223 through which additional idle air can flow into passages 218 and 219 and to the underside of the throttle. Passage 222 is continuously open to the flow of air to the engine, and receives that air from the crankcase of the engine through the usual PCV valve of the engine, with that crankcase air being drawn past thermostatic element 224 of unit 39 to thereby subject element 224 to crankcase air at engine temperature. The air delivered to passage 223 is controlled by cold start plunger 225 which is actuated by thermostatic element 224 to admit an increased flow of idle air to the engine to attain a fast idle condition when the engine is cold.

Figure 9:
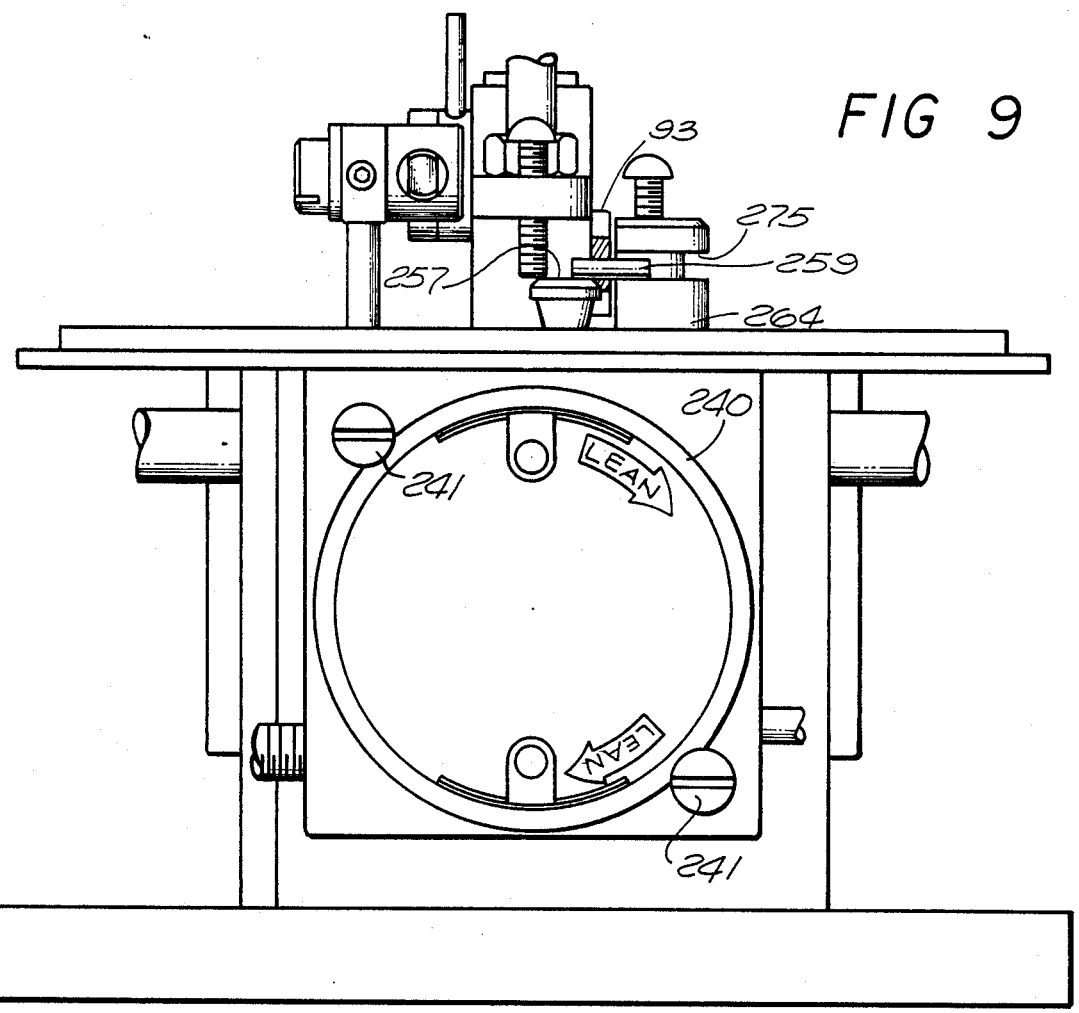
FIG. 9 is a front elevational view taken on line 9—9 of FIG. 1.
Figure 9A:
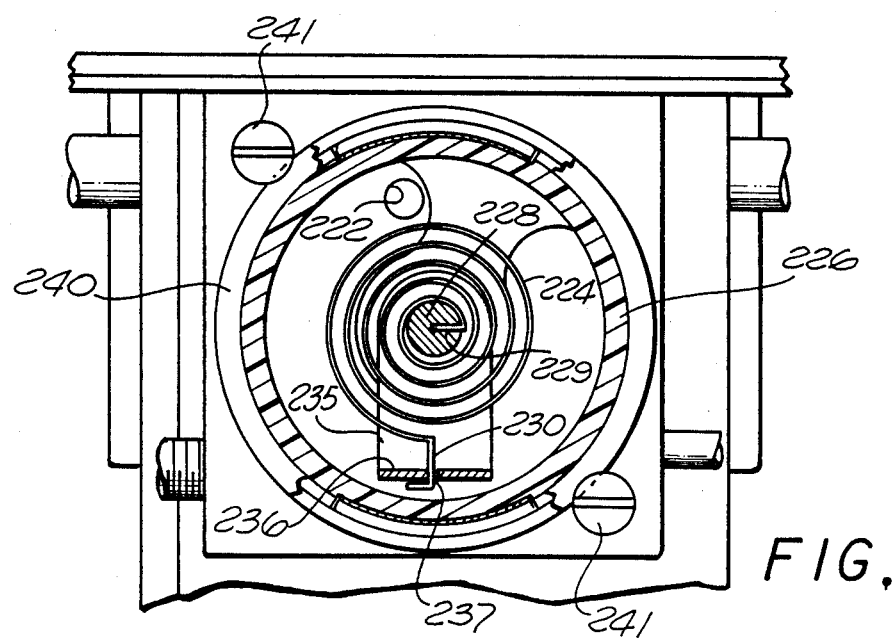
FIG. 9A is a vertical section taken on line 9A—9A of FIG. 1.

Thermostatic unit 39 is in certain respects essentially conventional, and includes a hollow body 226 of circular vertical section containing an annular chamber 227 and having a central post 228 projecting into the interior of that chamber. The thermostatic element 224 is a conventional spiral bimetallic spring having its inner end 229 rigidly attached to post 228 of part 226 (FIG. 9A), and having its outer end 230 operatively connected to a rotary camming element 231 (FIG. 10) mounted for rotation about a horizontal axis 232 within a cylindrical passage 233 formed in projection 38 of housing part 35. Element 231 has an outer cylindrical surface 234 which is a close fit within cylindrical recess 233 in projection 38, to mount element 231 for the desired rotary movement about axis 232. At its right end as viewed in FIG. 4, element 231 rigidly carries an arm 235 which may take the form of a sheet metal plate projecting radially outwardly from element 231 and having a portion 236 at its radially outer extremity bent to extend axially for engagement with the outer end 230 of bimetallic element 224. Preferably, portion 236 of element 235 contains a notch 237 into which end portion 230 of bimetallic element 224 projects to cause rotation of element 231 about axis 232 in correspondence with rotary movement of the end 230 of element 224 about that axis. As will be apparent, bimetallic element 224 spirals about the same axis 232, and hollow part 226 is adjustable rotatively about that axis relative to projection 38 of housing 35. To permit such adjustment, part 226 has a peripheral annular flange 238 which is held against vertical planar side surface 239 of projection 238 by a retaining ring 240, which in turn is tightened against flange 238 by two screws 241 connected threadedly into projection 38 and having heads which clamp ring 240 leftwardly in FIG. 12 to lock part 226 and the inner end of thermostatic element 224 in any desired rotary adjusted position relative to projection 38.

Figure 10A:
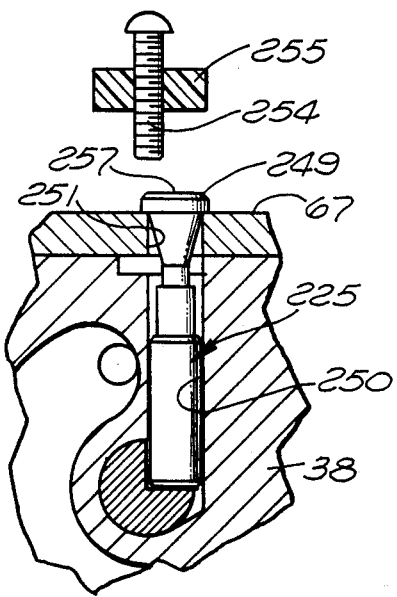
FIG. 10A shows the cold start plunger in the closed position to which it is returned thermostatically when the engine is at proper operating temperature.
Figure 10:
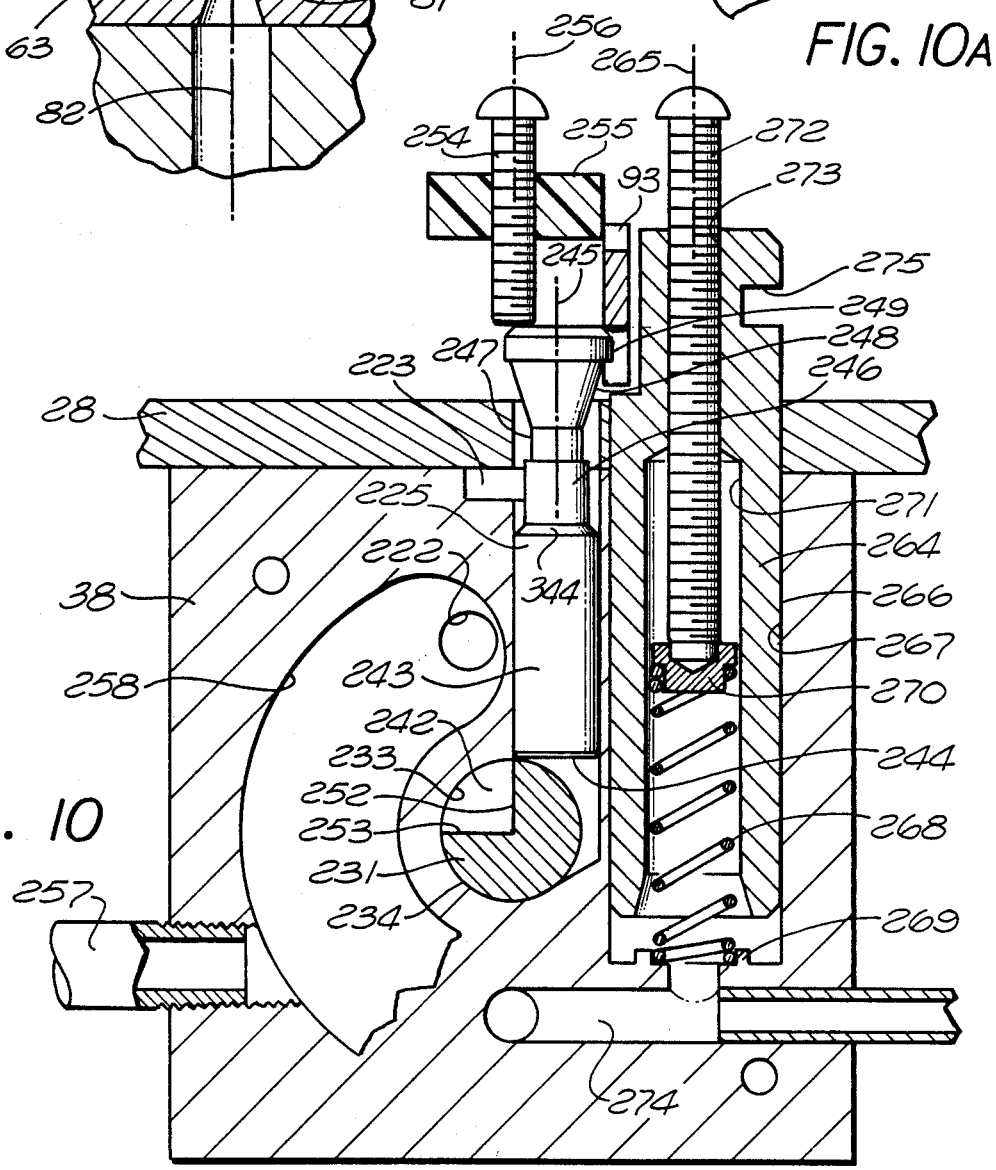
FIG. 10 is an enlarged fragmentary transverse vertical section taken on line 10—10 of FIG. 2.

As seen in FIGS. 10 and 10A, the external cylindrical surface 234 of camming element 231 is interrupted by provision of a camming recess 242 in element 231 for receiving a lower end portion 243 of cold start plunger 225. Plunger 225 may have a bottom horizontal planar surface 244, with the portion 243 being cylindrical about a vertical axis 245 between the level of bottom surface 244 and a transverse annular upwardly facing shoulder 344. Above shoulder 344, the plunger may have two reduced diameter portions 246 and 247 which may be cylindrical about axis 245. Surface 247 merges with an upwardly flaring frustroconical surface 248 terminating in a top annular horizontally extending peripheral flange 249. Cylindrical portion 243 of plunger 225 is slidably received within a correspondingly cylindrical passage 250 formed in projection 38 and extending vertically along axis 245, to guide the plunger for upward and downward movement along that axis between the lower closed position of FIG. 10A and the upper open position of FIG. 10. The previously mentioned high idle inlet passage 223 may be formed as a recess in the upper surface of projection 38, with the upper side of that recess being closed by top plate 28 except at the location of a cylindrical vertical passage 251 formed in the top plate in alignment with and of a diameter corresponding to passage 250 in projection 38. The tapering portion 248 of plunger 225 extends upwardly within opening 251 in the top plate, and in the FIG. 10A closed position of the plunger its annular flange 279 engages downwardly against the upper surface 67 entirely about opening 251 to block off the flow of air to the engine past plunger 225. When the engine is cold, thermostatic element 224 causes camming element 231 to cam plunger 225 upwardly to the position of FIGS. 4 and 10, in which flange 249 is spaced above the periphery of opening 251, and the tapered portion 248 of the plunger forms an annular space between surface 248 and opening 251 through which air can flow downwardly into the recess or passage 223 and then into the engine beneath throttle 15. The extent to which plunger 225 is raised by cam element 231 determines the amount of air entering past the plunger, and thus determines the high idle speed of the engine.

The configuration of camming recess 242 in element 231 is illustrated in FIGS. 10 and 10A. In the closed plunger position of FIG. 10A, the horizontal planar undersurface 244 of plunger 225 may be engageable with a planar camming surface 252 in recess 242, which surface 252 may itself extend directly horizontally in the FIG. 10A position. When the engine is cold, camming element 231 is turned by thermostatic element 224 in a counterclockwise direction from the position shown in FIG. 10A to the position shown in FIG. 10, so that the planar surface 252 of recess 242 swings upwardly to actuate the plunger upwardly to its cold start position. The temperature at which the cold start plunger or valve is closed can be determined by rotary adjustment of part 226 and the connected bimetallic element 224 as previously discussed. The upper cold start position of the plunger, to which it is elevated by the spring force of bimetallic element 224 when the engine is cold, can be set by adjustment of a screw 254 which is threadedly connected into the previously mentioned nylon part 255 for adjusting movement along a vertical axis 256 relative to part 255 and against the upper horizontal surface 257 of plunger 225. Part 255 projects to a location over the upper end of plunger 225, and has a tight threaded engagement with screw 254 to frictionally retain the screw in any desired set position. When the engine is cold, bimetallic element 224 actuates plunger 225 upwardly against the lower end of screw 254 to determine the fast idle speed of the engine.

Air and vapors from the crankcase and PCV valve enter projection 38 of housing part 35 through an inlet fitting 257 (FIG. 10) connected into a side of projection 38 and communicating with a chamber 258 in projection 38. That chamber communicates with the interior of part 226 of the thermostatic unit, and is closed by part 226, so that the thermostatic element 224 may be exposed to contact with air and fumes from the crankcase and may respond to changes in temperature of that air and the fumes. Passage 222 communicates with chamber 258, to receive the crankcase gases and direct them into the primary air flow passage at the underside of the throttle.

Upward movement of cold start plunger 225 by thermostatic element 224 also serves a second function of enriching the fuel and secondary air mixture which is delivered to the carburetor through passage 21. For this purpose, a portion of the upper surface 257 of plunger 225 extends to a position directly beneath one end of a horizontal pin 259 attached rigidly to an end of lever 93. That lever 93 may be stamped of sheet metal to the configuration shown, and be mounted by a screw 260 for pivotal movement relative to block 61 and the remainder of the carburetor body about a horizontal axis 261 extending perpendicular to opposite side surfaces 63 and 64 of block 61. Screw 260 extends through a horizontal passage 262 in block 61 (FIG. 5) and is journalled by that passage for rotation about axis 261, with the head having a screw 263 engaging surface 64 of block 61, and with the opposite end of the screw being connected threadedly into lever 93 in a forced fit relation maintaining the screw and lever in connected condition. The lever is received closely adjacent surface 63 of block 61, and has a planar vertical inner surface 364 slidably engaging surface 63. The valve 92 at the end of lever 93 may be formed integrally as a portion of the sheet metal part, with planar surface 264 continuing across the entire area of valving projection 92 so that that projection slidably engages surface 63 to effectively function as a valve element acting to partially or completely close off the admission of secondary air through inlet 90. When plunger 225 is in its upper cold start position, the upward movement of the plunger pivots lever 93 in a clockwise direction as viewed in FIG. 3 and to a position in which valving projection 92 at the end of the lever swings downwardly across opening 90 to prevent the admission of secondary air through that inlet, and thereby increase the richness of the secondary air-fuel mixture delivered to the primary air flow passage 13 through auxiliary passage 21. Pin 259 may be cylindrical about a horizontal axis and be received and rigidly retained within an opening in lever 93, and may be disposed perpendicular to surfaces 63, 64 and 364.

Lever 93 is also responsive to the devlopment of vacuum in the lower portion of primary air flow passage 13 in the carburetor when the engine starts. This vacuum actuation is attained by a second plunger 264 (FIG. 10) which is mounted for upward and downward movement along a vertical axis 265 within projection 38. Plunger 264 has an outer vertical cylindrical surface 266 fitting closely within a vertical cylindrical surface 267 formed in projection 38 to guide the plunger for its upward and downward movement. The plunger is yieldingly urged upwardly by a coil spring 268 which bears downwardly against a shoulder 269 in projection 38 and which bears upwardly against a part 270 within a vertical recess 271 in the plunger. A screw 272 threadedly engages a bore in the plunger at 273, and acts downwardly against part 270 to adjust the compression of spring 268 and thus determine the vacuum condition to which the plunger will respond. The vacuum or pressure condition in the lower portion of primary air flow passage 13 downstream of air actuated part 16 is communicated to the underside of plunger 264 through a passage 274 in projection 38 of housing part 35. When the engine is not running, plunger 264 is urged upwardly by spring 268. As soon as the engine starts, the vacuum developed in the intake manifold and in the lower portion of the carburetor beneath air actuated part 16 exerts downward force on plunger 64 tending to move it to a lower position. Vertical movement of the plunger is communicated to lever 93, by virtue of reception of a second end of pin 259 within an arcuate groove 275 formed in an upper portion of the plunger. Downward movement of the plunger in response to development of vacuum in the engine causes downward movement of pin 259 and upward movement of the opposite valving end 92 of lever 93, to thereby open the secondary air inlet 90 with resultant leaning of the mixture delivered to the engine. If the engine is cold when started, the spring force exerted on lever 93 by bimetallic element 244 is sufficient to resist downward displacement of plunger 264 by vacuum, and thus maintain valve 92 in closed or partially closed condition until the temperature of the engine rises and heating of bimetallic element 224 causes that element to release its spring force, permitting downward movement of the plunger and effecting closure of cold start plunger 225.

To permit clearing of a flooded condition of the carburetor, part 16 carries two pins 276 (FIGS. 11 and 11A) which are rigidly connected to member 16 by threaded connection of the lower ends of the pins into that member. Pins 276 are located at diametrically opposite sides of axis 29 and extend parallel to that axis through openings 277 in the upper portion of member 117. The pins may be cylindrical about their individual vertical axes 278, and terminate upwardly in planar horizontal upper end surfaces 279. The upper extremities of pins 276 project into notches 280 formed in throttle shaft 126 at opposite sides of throttle plate 15. Each of the notches is defined by a planar inner surface 281 which lies in a plane containing axis 128 and which extends diametrically with respect to the shaft, and two parallel opposite side surfaces 282 extending transversely of axis 128. In the FIG. 4 closed position of the throttle, surfaces 281 of the notches 280 extend horizontally, allowing pins 276 to move upwardly as illustrated in FIG. 11 to a position in which air actuated member 16 is closed. When throttle shaft 126 is turned to open the throttle, surfaces 281 of notches 280 act downwardly against the upper ends of pins 276, to cam the pins and connected member 16 downwardly to the open position of FIG. 11A. This mechanical displacement of member 16 downwardly upon opening of the throttle is at a rate less than the opening movement of member 16 which is produced by the flow of primary air therepast when the engine is in operation. Thus, in normal use of the engine the pins 276 do not come into play. However, if the engine is flooded and will not otherwise start or develop sufficient vacuum to open member 16, an operator may actuate the accelerator pedal to turn the throttle and its shaft through ninety degrees to the position of FIG. 11A, with resultant mechanical opening of member 16 so that the excessive fuel and vapors can be forced from the combustion chambers and a proper air-fuel mixture can be attained for starting of the engine.

For retaining the air cleaner 312 on the carburetor, an attaching screw 283 may project upwardly from fuel control block 61, for extension of the upper threaded end 284 of the screw vertically through an opening in a cover of the air cleaner so that a nut tightened downwardly on the threaded portion 284 of the screw can secure the air cleaner in place. The lower portion 285 of screw 283 is connected threadedly into block 61, along a vertical axis, and is adapted to be locked in any set position by tightening of a lock screw 286 downwardly against the upper surface of block 61. Preferably, screw 283 is bent as shown so that its upper and lower ends extend along vertical axes which are offset horizontally from one another. In the position of the screw illustrated in FIGS. 1 and 4, the upper portion 284 is aligned with the vertical central axis 29 of the carburetor for retention of an air cleaner centered about that axis. Screw 283 may be swung through one-hundred and eighty degrees about its lower portion 285 to bring the upper threaded portion to an offset condition for attachment of an air cleaner in which the connecting opening is correspondingly offset from the center of the cleaner.

To recapitulate briefly the manner of use of the carburetor, the device may be attached to virtually any of the numerous different types of internal combustion engines currently on the market. The different sets of mounting holes 27 in the corners of bottom plate 23 are arranged to fit the openings of most vehicle engines. Also, the carburetor can be turned to any of four different positions offset ninety degrees from one another, and the actuating linkage 136-137-138, etc. can be positioned at either of two opposite sides of the carburetor. Other bottom plates with different mounting holes or connections may be substituted for plate 23, to enable attachment of the carburetor to other engines, without affecting the overall height of the carburetor.

Figure 3:
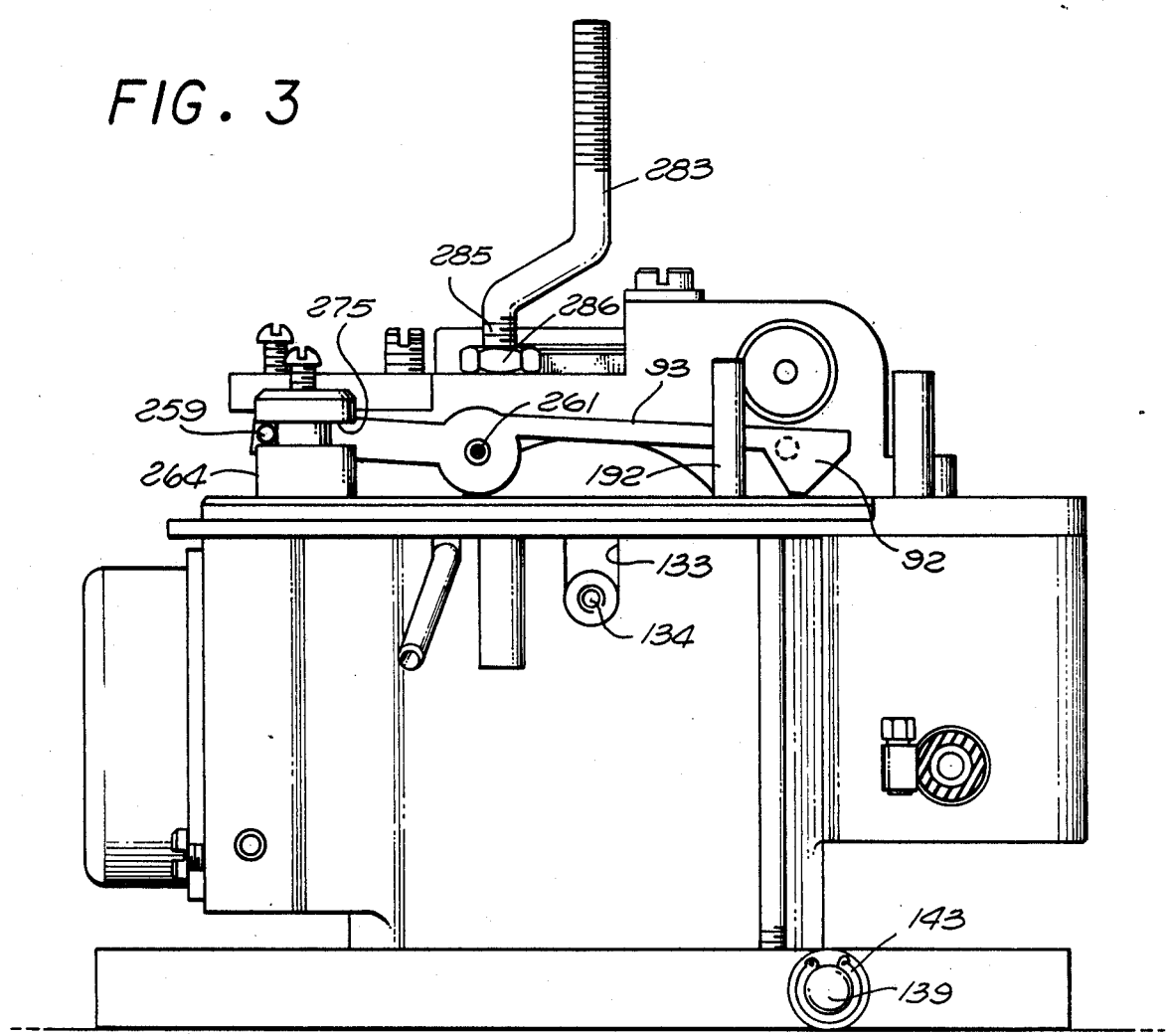
FIG. 3 is a side view taken on line 3—3 of FIG. 2.
Figure 3A:
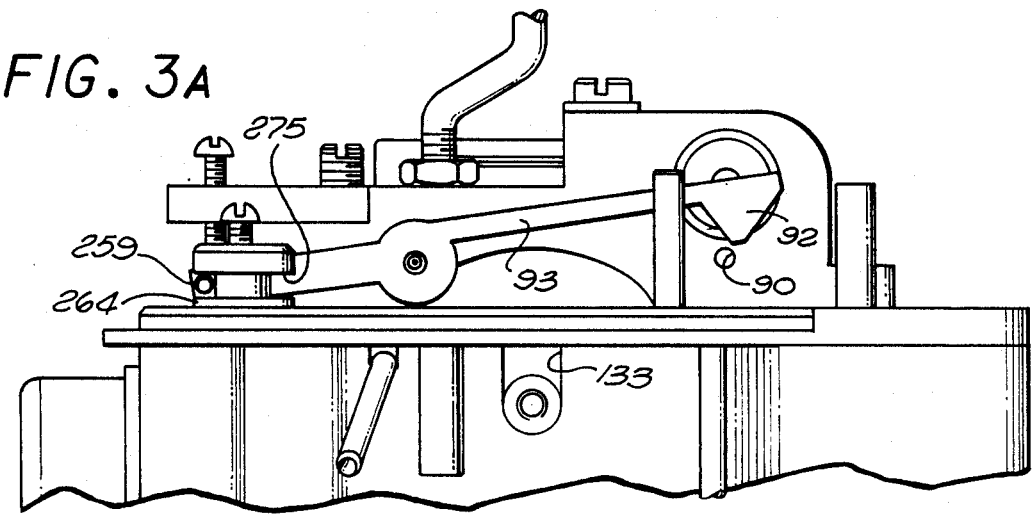
FIG. 3A is a fragmentary view corresponding to a portion of FIG. 3 and showing the parts in a condition to which they are actuated by vacuum when the engine is in operation.

Assume that the engine is initially cold and that cold start plunger 225 is therefore in its upper open position, vacuum plunger 264 is in its upper position, and lever 93 is in its FIG. 3 position closing or partially closing secondary air inlet 90. Also, the throttle is closed, and valve element 94 is held in its upper open position by the throttle. Air actuated element 16 is closed since no air is passing through the device, and rotary valve 20 may be in the condition illustrated in FIG. 4 in which a maximum amount of secondary air is delivered through valve 20.

Figure 14:
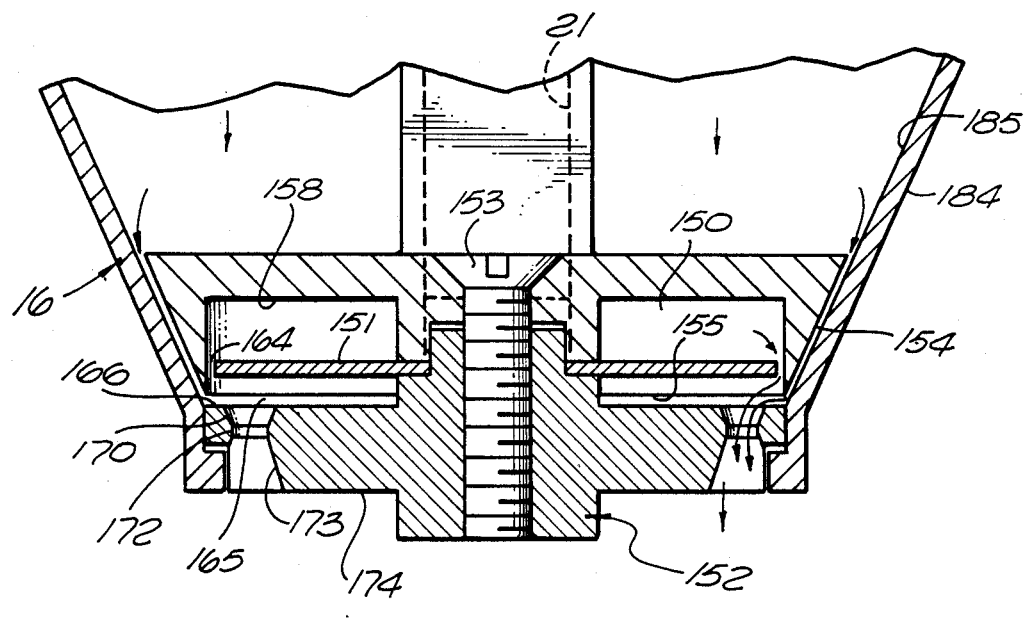
FIG. 14 is an enlarged fragmentary view similar to a portion of FIG. 11 and showing the air and fuel flow paths at idle speed.

If the operator now energizes the starter of the engine to crank the engine, rotation of the engine will cause development of a subatmospheric vacuum condition in the lower end of tubular portion 36 of housing part 35, beneath air actuated element 16, and that vacuum will cause a small flow of air downwardly past part 16 resulting in displacement of that part by the air slightly downwardly against the resistance of spring 17, as to the idle position represented in FIG. 14. If the throttle 15 is not opened during starting, the starting air is drawn through passage 219 to the underside of the throttle, from passage 222 connected to the engine crankcase, passage 223 which receives air past the upper end of plunger 225, and inlet 215 regulated by screw 220. When the engine starts, the resultant vacuum tends to pull plunger 264 downwardly against the resistance of spring 268, to thereby pivot lever 93 in a direction opening secondary air inlet 90 and leaning the fuel mixture. However, if the engine is cold, such downward movement of plunger 264 is prevented by the spring force exerted by bimetallic element 224 urging plunger 225 and the engaged end of lever 93 upwardly. The thermostatic unit thus attains the dual purposes of (1) maintaining plunger 225 in its upper FIG. 10 position to admit air past that plunger and thereby maintain a high idle speed, and (2) maintaining valve 92 in a closed or partially closed position producing a rich secondary air-fuel mixture. When the engine reaches a proper operating temperature, the bimetallic element 224 permits plungers 225 and 264 to move downwardly causing a reduction in the amount of inlet air which passes plunger 225 and a leaning of the secondary air-fuel mixture. The idle speed and mixture richness thus decrease gradually as the engine temperature increases.

As fuel is drawn into and through the secondary air flow passages, the fuel and air are intermixed with progressively increasing intimacy at various points along their circuitous path, including location 80, the venturi passage 113, the narrow annular space 164 provided at the periphery of disc 151 in unit 18, and the numerous restricted venturi passages 168 formed in bottom plate 152 of unit 18, in conjunction with the high velocity of the primary airflow which is attained at the location of the restriction 22 formed between member 16 and unit 18. As the mixture of secondary air and fuel flows into the primary flow of air at the lower end of unit 18, the fuel and air are so uniformly and intimately intermixed as to attain an optimum burning action in the cylinders of the engine. Further, it is highly significant that the throttle 15 is located upstream of air actuated member 16 and upstream of the restriction formed between that member and unit 18, and of the locations at which the secondary air-fuel mixture is emitted into the primary flow of air, so that the air and fuel after they have been brought together do not contact the throttle and the fuel can not condense on the throttle. In conventional carburetors, in which the throttle is usually downstream of the point at which fuel is introduced into the air, there is a decided tendency for condensation of a substantial amount of fuel on the throttle as it strikes the throttle in flowing past it.

When the throttle is opened from the FIG. 4 position to increase the speed of the engine, such opening movement of the throttle automatically closes valve element 94, to close off some of the secondary air and thereby avoid any tendency for stalling of the engine upon initial acceleration. As the throttle is opened progressively more widely, the increased rate at which primary air flows through the device causes a progressive opening of the air actuated part 16 downwardly, and such downward movement of member 16 acts through rod 191 and mechanism 195 at the top of the carburetor to rotate rotary valve element 74 in a direction progressively decreasing the amount of secondary air which flows through that valve element and thereby increasing the proportion of fuel in the fuel-secondary air stream flowing through passage 21 in unit 18. The increase in fuel flow in proportion to that rate of increase in primary air flow maintains a uniform fuel-air ratio in the mixture delivered to the engine.

In initially adjusting the carburetor for most efficient operation of the engine, the engine should first be run long enough to raise it to proper operating temperature, after which part 226 of the thermostatic unit 39 can be turned to a position in which plunger 225 is closed, so that vacuum plunger 264 may be drawn downwardly to actuate lever 93 for opening of inlet 90 to its normal operating condition. With the throttle closed and the engine operating at idle speed, screw 210 is loosened and rotary valve element 74 is turned by handle 213 to adjust the proportions of secondary air and fuel to an optimum condition for idle, after which screw 210 is tightened to retain valve element 74 in that set position relative to part 198. The throttle is then opened to operate the engine at a relatively high speed, at which screw 204 is loosened and connector part 197 is shifted along portion 212 of part 198 and within slot 201 until an optimum air-fuel ratio and corresponding optimum operation is attained at that higher speed. These two settings will result in maintenance of the proper air-fuel ratio for all speeds. The idle speed can of course be adjusted at any time by screw 220. The vacuum at which plunger 264 opens lever actuated secondary air flow valve 92 is set by adjusting screw 272 to vary the force exerted by spring 268, and the high idle speed is determined by adjustment of screw 254.

Figure 15:
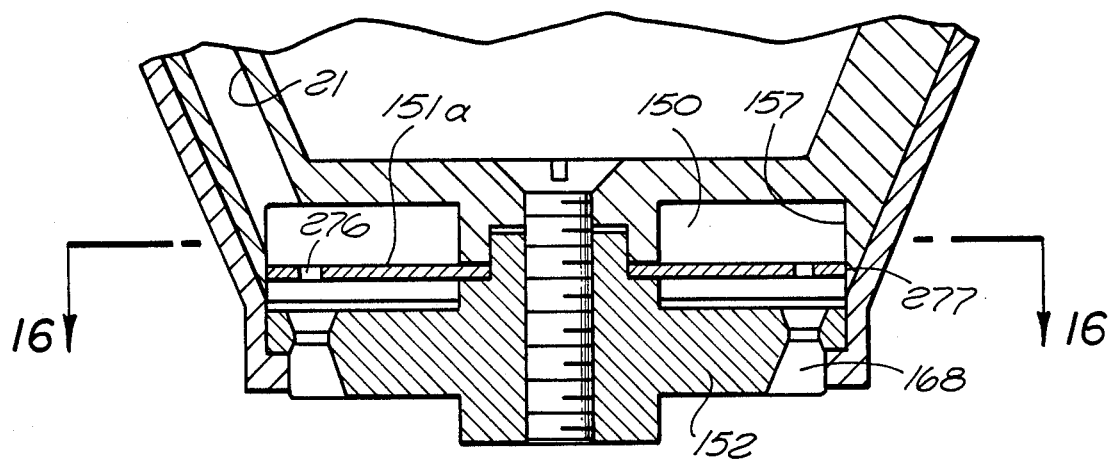
FIG. 15 is a view similar to a portion of FIG. 4, but showing a variational arrangement.

FIG. 15 illustrates a variational arrangement in which there is substituted for the imperforate disc 151 of unit 18 a disc 151a containing a series of circularly spaced openings 276 through which the fuel-secondary air mixture above the disc can flow downwardly to the underside of the disc for admission to the venturi passages 168. In this FIG. 15 arrangement, the circular peripheral edge 277 of disc 151a is at a diameter slightly greater than the peripheral edge of disc 151 of the first form of the invention, to engage side wall surface 157 of recess 150 and thus require flow of all of the fuel and air downwardly through openings 276. Preferably, the openings 276 are the same radial distance from axis 29 as are the venturi passages 168. There may be two of the venturi passages for each of the openings 276 with each opening being located circularly midway between the two associated venturi passages.

Figure 17:
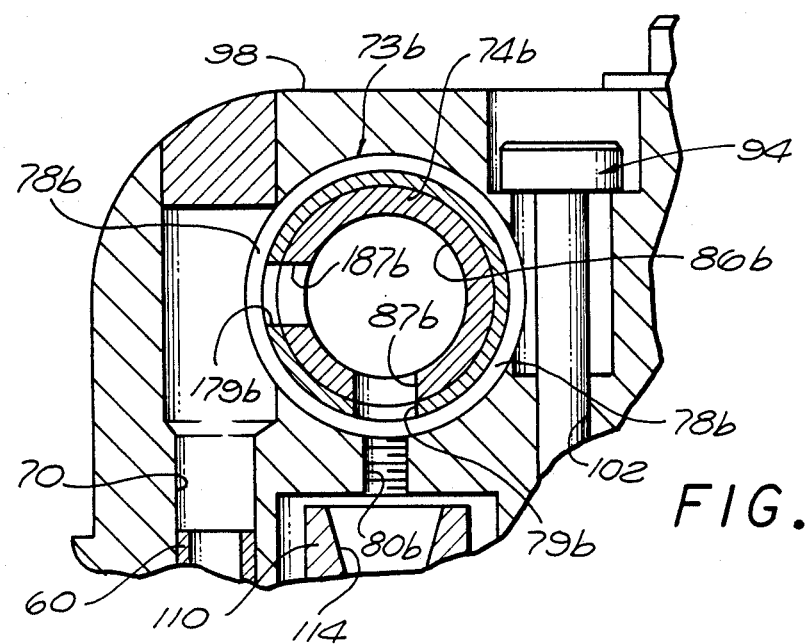
FIG. 17 is a fragmentary view corresponding to a portion of FIG. 4 but showing a variational rotary valve element.

FIG. 17 illustrates fragmentarily another variational form of the invention, which may be identical with the arrangement illustrated in FIGS. 1 through 14 except that the sleeve 73b and rotary valve element 74b of FIG. 17 are changed from the corresponding elements 73 and 74 of the first form of the invention to further enhance the initial intermixture of fuel and secondary air. In FIG. 17, a central air inlet passage 86b corresponds to but is slightly larger in diameter than passage 86 of FIGS. 4 and 6. Passage 87b corresponds to passage 87 of FIGS. 4 and 6, and extends downwardly from passage 86b to bottom opening 79b in sleeve 73b, which is the same as opening 79 of the first form of the invention. In addition to passages 86b and 87b, rotary valve element 74 contains another passage 187b which extends radially outwardly from passage 86b at a location offset ninety degrees from passage 87b, and extending leftwardly as seen in FIG. 17. This passage 187b communicates with a second opening 179b formed in sleeve 73b at a location offset ninety degrees from opening 79b. Secondary air may therefore flow from central passage 86b leftwardly through passage 187b and opening 179b into annular groove 78b corresponding to groove 78 of the first form of the invention, to flow arcuately downwardly with the fuel toward passage 80b. The secondary air which follows this path is drawn at high velocity into the groove to attain an initial intermixture of the air with the fuel before it reaches the location of bottom opening 79b at which further air from passage 87b is drawn at high velocity into the air-fuel mixture for flow therewith through passage 80b, etc. Second passage 187b and opening 179b thus supplement the other effects discussed above in attaining optimum atomization of the fuel. Passage 187b and opening 179b preferably correspond in size to passage 87b and opening 79b respectively.

An important advantage of the carburetors formed in accordance with the present invention resides in the fact that they do not require the usual small metering tubes or metering slots of most conventional carburetors. Such tubes and slots frequently become clogged or restricted by impurities in the fuel in a manner changing the operational characteristics of the carburetor and engine and necessitating cleaning and/or disassembly or other maintenance of the carburetor. These problems and much of the maintenance required by existing carburetors are completely eliminated by the carburetors of the present invention. Another important advantage of these carburetors results from the fact that the air actuated element 16 automatically closes completely during shut down of the engine or under back fire conditions, and in doing so closes off the air supply and reduces or eliminates the possibility of fire in the carburetor. Closure of element 16 also inhibits the return of gases from the intake manifold and cylinders of the engine to the atmosphere and in that way further reduces pollution of the atmospheric air. Additionally, the virtually sealed condition of the carburetor during shut down periods prevents residue build up within the interior of the carburetor to further reduce the necessity for cleaning of the carburetor. Another advantageous feature of the device lies in the unique manner in which it has been constructed throughout to avoid the necessity for seals or gaskets of any type, and thus avoid the usual malfunction problems caused by shrinkage and deterioration of seals and gaskets after prolonged shut down or in areas experiencing drastic temperature changes.

While certain specific embodiments of the present invention have been disclosed as typical, the invention is of course not limited to these particular forms, but rather is applicable broadly to all such variations as fall within the scope of the appended claims.

I claim:

1. A carburetor comprising:
    a body structure through which a vacuum induced primary flow of air passes;
    a butterfly throttle valve adjustable to regulate said primary flow of air;
    two members downstream of said throttle valve forming between them a restriction through which said air flows to locally increase the velocity of the air at said restriction;
    a first of said members being movable relative to the second member by the force of air flowing therebetween, in a direction increasing the width of said restriction upon an increase in the rate of flow through the restriction;
    a spring yieldingly resisting opening movement of said first member in said direction increasing the width of said restriction;
    means for directing fuel and secondary air into admixture with one another in isolation from said primary flow of air to form a combined stream, and then directing said combined stream for induction by vacuum into said primary flow of air downstream of said throttle valve and closely adjacent said restriction;
    said means including a second valve operable to regulate the flow of said secondary air before admixture with the fuel;
    a connection between said first member and said second valve for progressively closing said second valve in response to opening movement of said first member;
    said connection being adjustable to controllably vary movement of said second valve for a particular movement of said first member;
    said means including a third valve regulating flow of additional secondary air to the fuel;
    vacuum actuated means automatically responsive to development of a vacuum condition downstream of said throttle valve to actuate said third valve in a direction increasing the flow of secondary air to the fuel;
    a fourth valve for admitting a flow of supplementary fast idle air under cold start conditions to a location downstream of said throttle valve; and
    thermostatic control means responsive to an increase in temperature to move said fourth valve in a closing direction, and operable at low temperature to prevent opening movement of said third valve.

2. A carburetor as recited in claim 1, including a fifth valve regulating flow of further secondary air to the fuel, and a mechanical connection between said throttle valve and said fifth valve maintaining said fifth valve in an open position when the throttle valve is closed and actuating the fifth valve rapidly to its most closed position upon initial opening movement of the throttle valve.

3. A carburetor comprising:
    a body structure through which a vacuum induced primary flow of air passes;
    a throttle valve adjustable to regulate said primary flow of air;
    a flow actuated member positioned along the path of said primary flow of air and which is movable by the air to different positions varying in correspondence with the rate of air flow past said member;
    means for directing fuel and secondary air into admixture with one another in isolation from said primary flow of air to form a combined stream, and then directing said combined stream for induction by vacuum into said primary flow of air, and including a second valve operable to regulate the flow of said secondary air before admixture with the fuel; and
    means operable by said flow actuated member to vary the setting of said second valve in response to movement of said flow actuated member by air flowing therepast;
    said second valve including a rotary valve element actable by rotary movement about an axis to variably restrict the flow of said secondary air;
    said means operable by said flow actuated member including a second rotary element actuable rotatively about said axis by said flow actuated member in accordance with movement of the flow actuated member by air flowing therepast, and a connection for transmitting rotary motion from said second rotary element to said rotary valve element and which is adjustable to controllably vary the range of movement of said rotary valve element for a particular range of movement of said flow actuated member.

4. A carburetor as recited in claim 3, in which said connection includes an adjusting screw having a shank extending through an opening in said second rotary element and connected threadedly into said rotary valve element and which is tightenable to clamp said second rotary element between a head of the screw and said rotary valve element to lock them in fixed rotary positions.

5. A carburetor as recited in claim 4, including an actuating arm carried by said rotary valve element and projecting therefrom and which is accessible for manual actuation to turn said rotary valve element to any desired setting relative to said second rotary element for retention in that setting by tightening of said screw.

6. A carburetor comprising:
a body structure through which a vacuum induced primary flow of air passes;
a throttle valve adjustable to regulate said primary flow of air;
a flow actuated member positioned along the path of said primary flow of air and which is movable by the air to different positions varying in correspondence with the rate of air flow past said member;
means for directing fuel and secondary air into admixture with one another in isolation from said primary flow of air to form a combined stream, and then directing said combined stream for induction by vacuum into said primary flow of air, and including a second valve operable to regulate the flow of said secondary air before admixture with the fuel; and
means operable by said flow actuated member to vary the setting of said second valve in response to movement of said flow actuated member by air flowing therepast;
said flow actuated member being mounted for movement essentially along a first axis by air flowing therepast;
said second valve including a rotary valve element operable by rotary movement about a second axis to regulate the flow of said secondary air;
said means operable by said flow actuated member including a first connector part movable along said first axis with said flow actuated member, and a second connector part mounted to turn about said second axis with said rotary valve element and having a sliding connection with said first connector part for converting movement of the flow actuated member along said first axis to rotary movement of said rotary valve element about said second axis.

7. A carburetor as recited in claim 6, including means attaching said second connector part to said rotary valve element for adjusting movement relative thereto essentially radially of said second axis to adjust the rotary movement of said rotary valve element relative to the movement of said flow actuated member along said first axis.

8. A carburetor as recited in claim 6, in which said first connector part contains a slot extending generally transversely of said first axis, and said second connector part is received within said slot and movable therealong and connected to said rotary valve element for adjusting movement relative thereto essentially radially of said second axis.

9. A carburetor as recited in claim 8, in which said means operable by said flow actuated member includes a second rotary element connected to said rotary valve element for rotary adjustment about said second axis relative to said rotary valve element and which carries said second connector part for said adjusting movement radially of said second axis.

10. A carburetor comprising:
a body structure through which a vacuum induced primary flow of air passes;
a throttle valve adjustable to regulate said primary flow of air;
a flow actuated member positioned along the path of said primary flow of air and which is movable by the air to different positions varying in correspondence with the rate of air flow past said member;
means for directing fuel and secondary air into admixture with one another in isolation from said primary flow of air to form a combined stream, and then directing said combined stream for induction by vacuum into said primary flow of air, and including a second valve operable to regulate the flow of said secondary air before admixture with the fuel; and
means operable by said flow actuated member to vary the setting of said second valve in response to movement of said flow actuated member by air flowing therepast;
said flow actuated member being mounted for movement along a first axis by air flowing therepast;
said second valve including a rotary valve element operable by rotary movement about a second axis to regulate said secondary flow of air;
said means operable by said flow actuated member including a rod connected to said flow actuated member and which extends essentially parallel to said first axis and is guided for movement with the flow actuated member essentially parallel to said first axis, and an operative connection between said rod and said rotary valve element for converting movement of said rod parallel to said first axis to rotary movement of the rotary valve element about said second axis;
said connection including a first connector part carried by said rod and having a slot extending essentially transversely of said first axis, a second connector part received in said slot and movable therealong, a third connector part attached to said rotary valve element for rotation therewith about said second axis, and means attaching said second connector part to said third connector part for adjusting movement relative thereto essentially radially of said second axis.

11. A carburetor as recited in claim 10, including means attaching said third connector part to said rotary valve element for rotary adjustment relative thereto about said second axis.

12. A carburetor as recited in claim 10, in which said means attaching said second connector part to said third connector part include an arm projecting from said third connector part and extending through an opening in said second connector part, and a screw connected threadedly to said second connector part and tightenable against said arm to lock said second connector part at any of different positions along said arm.

13. A carburetor as recited in claim 12, including a second adjusting screw having a shank extending through an opening in said third connector part and connected threadedly to said rotary valve element and which is tightenable to clamp said third connector part in a selected rotary position relative to said rotary valve element about said second axis.

14. A carburetor as recited in claim 13, including a second arm projecting from said rotary valve element and which is manually actuable to set the rotary valve element in different rotary settings relative to said third connector part.

15. A carburetor comprising:

a body structure through which a vacuum induced primary flow of air passes;

a throttle valve adjustable to regulate said primary flow of air;

means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel; and control means automatically operable, when said throttle valve is moved in an opening direction increasing said primary flow of air to move said second valve in a closing direction enriching said combined stream;

said control means being operable to move said second valve rapidly from a maximum open position thereof to its most closed position during initial opening movement of the throttle valve.

16. A carburetor comprising:

a body structure through which a vacuum induced primary flow of air passes;

a throttle valve adjustable to regulate said primary flow of air;

means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;

control means automatically operable, when said throttle valve is moved in an opening direction increasing said primary flow of air to move said second valve in a closing direction enriching said combined stream;

said control means being operable to move said second valve progressively and gradually in a closing direction through substantially the entire range of opening movement of said throttle valve to maintain a proper air-fuel ratio in different throttle settings; and a third valve regulating delivery of a portion of the secondary air to the fuel and which is operable automatically and rapidly from a maximum open position thereof to its most closed position during initial opening movement of the throttle valve.

17. A carburetor comprising:

a body structure through which a vacuum induced primary flow of air passes;

a throttle valve adjustable to regulate said primary flow of air;

means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel; and control means automatically operable, when said throttle valve is moved in an opening direction increasing said primary flow of air to move said second valve in a closing direction enriching said combined stream;

said second valve including a rotary valve element and a second element thereabout;

said elements containing registering air passages which move to positions of progressively decreasing registry to restrict the flow of secondary air as the throttle valve is opened.

18. A carburetor comprising:

a body structure through which a vacuum induced primary flow of air passes;

a throttle valve adjustable to regulate said primary flow of air;

means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel; and control means automatically operable, when said throttle valve is moved in an opening direction increasing said primary flow of air to move said second valve in a closing direction enriching said combined stream;

said second valve including a tubular sleeve having a side wall containing an opening, and a rotary valve element within said sleeve containing an air flow passage which moves to positions of decreasing registry with said opening upon rotation of said valve element as the throttle valve is opened;

said side wall of said sleeve having a groove in its outer surface through which fuel flows about the sleeve for mixture with secondary air at said opening.

19. A carburetor as recited in claim 18, including a third valve controlling delivery of additional secondary air into said groove at a location offset from said opening and for mixture with the fuel at said opening.

20. A carburetor as recited in claim 19, including means for actuating said third valve rapidly from a maximum open position thereof to its most closed position during initial opening movement of the throttle valve.

21. A carburetor as recited in claim 18, in which said tubular sleeve and said rotary valve element contain additional openings offset circularly from said first mentioned opening and through which air flows from said passage to said groove for admixture with the fuel before the fuel reaches said first mentioned opening, said additional openings moving to positions of progressively decreasing registry as the throttle valve is opened.

22. A carburetor as recited in claim 21, including a third valve controlling delivery of additional secondary air into said groove at a location offset from said first mentioned opening and said additional openings and for admixture with the fuel at said first mentioned opening.

23. A carburetor comprising:

a body structure through which a vacuum induced primary flow of air passes;

a throttle valve adjustable to regulate said primary flow of air;

means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;

control means automatically operable, when said throttle valve is moved in an opening direction increasing said primary flow of air to move said second valve in a closing direction enriching said combined stream;

said control means being operable to move said second valve progressively and gradually in a closing direction through substantially the entire range of opening movement of said throttle valve to maintain a proper air-fuel ratio in different throttle settings;

a third valve controlling the flow of a portion of the secondary air to the fuel;

vacuum actuated means automatically responsive to development of a vacuum condition to move said third valve in an opening direction increasing the flow of secondary air to the fuel; and a fourth valve for regulating additional secondary air flow to the fuel and which is operable automatically and rapidly from a maximum open position to its most closed position during initial opening movement of the throttle valve.

24. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;
control means automatically operable, when said throttle valve is moved in an opening direction increasing said primary flow of air to move said second valve in a closing direction enriching said combined stream;
said control means being operable to move said second valve progressively and gradually in a closing direction through substantially the entire range of opening movement of said throttle valve to maintain a proper air-fuel ratio in different throttle settings;
a third valve controlling the flow of a portion of the secondary air to the fuel;
vacuum actuated means automatically responsive to development of a vacuum condition to move said third valve in an opening direction increasing the flow of secondary air to the fuel; and
thermostatic means operable in response to a low temperature to prevent movement of said third valve in said opening direction by said vacuum actuated means.

25. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel; and
control means automatically operable, when said throttle valve is moved in an opening direction increasing said primary flow of air to move said second valve in a closing direction enriching said combined stream;
said body structure containing a passage through which said primary flow of air passes;
said throttle valve being a butterfly valve mounted for pivotal movement about an axis disposed essentially transversely of said passage between an essentially closed position disposed generally transversely of said passage and an open position;
said control means including an element positioned to be engaged by said butterfly valve in its most closed position for deflection thereby and operable upon such deflection to open said second valve.

26. A carburetor as recited in claim 25, including means limiting displacement of said element by said butterfly valve in its most closed position and serving as a stop determining said most closed position and preventing movement of the butterfly valve therebeyond.

27. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel; and
control means automatically operable, when said throttle valve is moved in an opening direction increasing said primary flow of air to move said second valve in a closing direction enriching said combined stream;
said control means including an element engageable and displaceable by said throttle valve in its most closed position to actuate said second valve;
said element being constructed to limit closing movement of the throttle valve and thereby determine its most closed position and prevent movement of the throttle valve beyond that position.

28. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel; and
control means automatically operable, when said throttle valve is moved in an opening direction increasing said primary flow of air to move said second valve in a closing direction enriching said combined stream;

said body structure containing a passage through which said primary flow of air passes;

said throttle valve being a butterfly valve mounted to pivot about an axis disposed essentially transversely of said passage and which is disposed generally transversely across said passage in an essentially closed position of the throttle valve;

said control means including a vertically extending pin guided for vertical longitudinal movement in said body structure and having a lower end projecting to a location for engagement and upward displacement by an edge portion of said butterfly valve in said essentially closed position;

said second valve including an enlarged head formed at an upper end of said pin and engageable with a seat in a lower position of the pin and head to essentially close off said flow of secondary air.

29. A carburetor as recited in claim 28, including a part positioned in the path of upward movement of said head and limiting upward displacement thereof to act as a stop limiting closing movement of said butterfly valve and determining its most closed position.

30. A carburetor as recited in claim 28, including means forming a vertical passage containing said pin and having an upper enlarged portion movably containing said head, and a part removably connected to said body structure at a location projecting at least partially across said upper enlarged portion of said passage and limiting upward displacement of said pin and head in a manner acting as a stop determining the most closed position of said throttle valve.

31. A carburetor as recited in claim 30, in which said part is a washer extending partially across an upper side of said upper enlarged portion of said passage, there being a screw extending downwardly through said washer and connected threadedly into said body structure.

32. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;
control means automatically responsive to development of a vacuum condition to move said second valve in an opening direction; and
thermostatic means operable to prevent movement of said second valve in said opening direction at low temperature and permit movement of the second valve in said opening direction at a higher temperature.

33. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;
control means automatically responsive to development of a vacuum condition to move said second valve in an opening direction;
said control means including a lever mounted for pivotal movement upon development of said vacuum condition and operable upon such pivotal movement to move said second valve in an opening direction; and
thermostatic means operable to limit pivotal movement of said lever in a direction opening said second valve at low temperature and permit pivotal movement of the lever in a direction opening said second valve at a higher temperature.

34. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;
control means automatically responsive to development of a vacuum condition to move said second valve in an opening direction;
said control means including a lever mounted for pivotal movement relative to said body structure;
said second valve including a valve element carried at a first end of said lever and extending at least partially across a secondary air inlet and acting to vary the effective open area of said inlet upon pivotal movement of the lever;
said control means including a plunger exposed to and actuable by said vacuum condition and acting against a second end of the lever to pivot the lever in a direction opening said second valve upon development of the vacuum condition;
thermostatic means responsive to a change in temperature; and
a unit actuable upwardly and downwardly by said thermostatic means and acting at a low temperature to block pivotal movement of said lever in a direction opening said second valve.

35. A carburetor as recited in claim 34, including means forming a passage for conducting a supplementary flow of air under cold start conditions to a location downstream of said throttle valve, said unit actuable by said thermostatic means having a portion forming a third valve operable in a lower position to close off said supplementary flow of air and in an upper position to allow said supplementary flow of air.

36. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;

control means automatically responsive to development of a vacuum condition to move said second valve in an opening direction; and thermostatic means operable at a low temperature to block opening movement of said second valve;

said thermostatic means including a third valve acting at said low temperature to admit a supplementary flow of air to a location downstream of said throttle valve and acting upon an increase in temperature to block off said supplementary flow of air.

37. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;
thermostatic control means automatically operable under cold start conditions to actuate said second valve in a manner restricting the flow of said secondary air and thereby enriching said combined stream, and automatically operable upon an increase in temperature to actuate said second valve in a manner reducing the restriction to said secondary air and thereby leaning said combined stream; and
a third valve actuable by said thermostatic control means to control flow of supplementary air to a location downstream of said throttle valve in accordance with temperature changes;
said third valve being positioned to block opening movement of said second valve under cold start conditions.

38. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;
thermostatic control means automatically operable under cold start conditions to actuate said second valve in a manner restricting the flow of said secondary air and thereby enriching said combined stream, and automatically operable upon an increase in temperature to actuate said second valve in a manner reducing the restriction to said secondary air and thereby leaning said combined stream;
a lever mounted for pivotal movement and carrying said second valve at an end thereof; and
a third valve controlling delivery of supplementary air to a location downstream of said throttle valve and which is actuable by said thermostatic control means at low temperature to deliver said supplementary air and at higher temperatures to restrict supplementary air;

said third valve being positioned to block pivotal movement of said lever in a direction to open said second valve at said low temperature.

39. A carburetor comprising:
a body structure through which a vacuum induced primary flow of air passes;
a throttle valve adjustable to regulate said primary flow of air;
means for directing fuel and secondary air into admixture with one another in isolation from said primary flow of air to form a combined stream, and then directing said combined stream for induction by vacuum into said primary flow of air, and including a second valve operable to vary the flow of said secondary air into admixture with said fuel;
thermostatic control means automatically operable under cold start conditions to actuate said second valve in a manner restricting the flow of said secondary air and thereby enriching said combined stream, and automatically operable upon an increase in temperature to actuate said second valve in a manner reducing the restriction to said secondary air and thereby leaning said combined stream;
a lever mounted for pivotal movement and carrying said second valve; and
a third valve actuable upwardly and downwardly by said thermostatic control means and operable in an upper position at low temperature to pass supplementary air to a location downstream of the throttle valve and in a lower position at an increased temperature to restrict said supplementary air;
said third valve in said upper position being location to block downward movement of a second end of said lever and thereby prevent pivotal movement of the lever in a direction opening said second valve.

40. A carburetor comprising:
a body structure through which a flow of air passes along a path;
a throttle valve adjustable to regulate said flow of air; and
two elements forming between them a restriction through which said air flows to locally increase the velocity of the air at said restriction;
a first of said elements being movable relative to the body structure and relative to the second of said elements by the force of air flowing therebetween, in a relation varying the width of said restriction in accordance with the rate of flow of air through the restriction;
said second element containing fuel passages means through which fuel flows within said second element and discharging fuel into the air flowing through said body structure for admixture therewith;
said first element being movable essentially along a predetermined axis relative to said body structure and said second element, with said restriction between the elements being essentially annular;
said passage means within said second element forming a circular series of openings through which the fuel is emitted into said flow of air at a location closely adjacent said first element.

41. A carburetor as recited in claim 40, in which said openings flare to progressively increasing widths in the direction of flow of said fuel.

42. A carburetor as recited in claim 40, including means for introducing a secondary flow of air into admixture with fuel delivered to said passage means in said second element and at a location isolated from said path of air flow through the body structure.

43. A carburetor as recited in claim 42, including a second valve for regulating said secondary flow of air and operable by said first element to progressively close said secondary flow of air in response to movement of said first element resulting from an increased flow of air along said path.

44. A carburetor comprising:
a body structure through which a flow of air passes along a path;
a throttle valve adjustable to regulate said flow of air; and
two elements forming between them a restriction through which said air flows to locally increase the velocity of the air at said restriction;
a first of said elements being movable relative to the body structure and relative to the second of said elements by the force of air flowing therebetween, in a relation varying the width of said restriction in accordance with the rate of flow of air through the restriction;
said second element containing fuel passage means through which fuel flows within said second element and discharging fuel into the air flowing through said body structure for admixture therewith;
said first element moving essentially along a predetermined axis relative to said second element to vary said restriction;
said passage means in said second element including an essentially annular recess formed in said second element and receiving said fuel, a plate disposed across a downstream side of said recess and forming a restriction or restrictions through which the fuel flows, and an essentially annular structure at a downstream side of said plate and containing a circular series of openings near said first element and near said restriction for emitting fuel into said flow of air.

45. A carburetor as recited in claim 44, in which said first element has a generally tubular portion extending about said essentially annular structure, and said openings flare to progressively increasing widths in a downstream direction and are at least partially open at a radially outer side adjacent said generally tubular portion of said first element.

46. A carburetor as recited in claim 45, in which said plate contains a series of circularly spaced apertures through which fuel flows toward said openings.

47. A carburetor as recited in claim 45, in which said plate has a peripheral edge spaced a short distance from a wall of said annular recess for restricted flow of fuel therebetween.

48. A carburetor as recited in claim 45, in which said first and second elements have essentially annular opposed surfaces tapering in a downstream direction and forming at least a portion of said restriction therebetween.

49. A carburetor comprising:
a body structure through which a flow of air passes along a path;
a throttle valve adjustable to regulate said flow of air;
two elements forming between them a restriction through which said air flows;
a first of said elements being movable relative to the body structure and relative to the second of said elements by the force of air flowing therebetween, in a relation varying the width of said restriction in accordance with the rate of flow of air through the restriction; and
an operative connection between said throttle valve and said first element operable in response to opening movement of said throttle valve to move said first element in a direction opening said restriction independently of the actuation of said first element by air flowing therepast;
said body structure containing a passage through which said flow of air passes;
said throttle valve being a butterfly valve having a shaft connected to the butterfly valve and mounted to turn therewith about an axis disposed essentially transversely of said passage;
said operative connection including pins connected to said first element and projecting into recesses in said shaft and adapted to be actuated by the shaft for displacing said first element in an opening direction relative to said second element in response to rotation of the throttle valve and shaft about said axis in a direction opening the throttle valve.

50. A carburetor comprising:
a body structure through which a vacuum induced primary flow of air passes;
a throttle valve adjustable to regulate said primary flow of air;
a flow actuated member positioned along the path of said primary flow of air and which is movable by the air to different positions varying in correspondence with the rate of air flow past said member;
means for directing fuel and secondary air into admixture with one another in isolation from said primary flow of air to form a combined stream, and then directing said combined stream for induction by vacuum into said primary flow of air, and including a second valve operable to regulate the flow of said secondary air before admixture with the fuel;
control means for automatically actuating said second valve to vary the flow of said secondary air upon actuation of said throttle valve varying said primary flow of air;
a diffuser structure containing a passage through which said combined stream is directed between said second valve and the point of admixture of the combined stream with said primary flow of air, said passage having a restriction for increasing the velocity of said combined stream and thereby enhancing intimate intermixture of the fuel and secondary air;
said passage of the diffuser structure having a first portion tapering downstream, a second portion beyond said first portion forming said restriction, and a third portion beyond said restricted second portion and flaring to a progressively increasing diameter;
said diffuser structure having a tubular portion containing said tapering first portion of said passage and which faces toward said second valve to receive fuel and secondary air therefrom;
means forming a chamber containing said tubular portion of said diffuser structure and having a side wall extending about and spaced radially from said tubular portion and an end wall spaced from an end of the tubular structure; and an additional air inlet for admitting air into a space radially between said tubular portion of said diffuser structure and said side wall of said chamber for entry into said tapering portion of said passage with said fuel and secondary air.

51. A carburetor as recited in claim 50, in which there is a second additional inlet for admitting air into the space radially between said tubular portion of the diffuser structure and said side wall of said chamber, and an additional valve automatically responsive to a predetermined change in condition to vary the flow of secondary air through said second additional inlet.

52. A carburetor comprising:
a body structure through which a vacuum induced primary flow of air passes;
a throttle valve adjustable to regulate said primary flow of air;
a flow actuated member positioned along the path of said primary flow of air and which is movable by the air to different positions varying the width of a restriction through which the air flows in correspondence with the rate of air flow past said member; and
means for directing fuel and secondary air into admixture with one another in isolation from said primary flow of air to form a combined stream, and then directing said combined stream into said primary flow of air for intimate intermixture therewith;
said means forming a plurality of circularly spaced passages through which said fuel and secondary air flow at a location closely adjacent said restriction;
said passages having open sides.

53. A carburetor comprising:
a body structure through which a vacuum induced primary flow of air passes;
a throttle valve adjustable to regulate said primary flow of air;
a flow actuated member positioned along the path of said primary flow of air and which is movable by the air to different positions varying the width of a restriction through which the air flows in correspondence with the rate of air flow past said member; and
means for directing fuel and secondary air into admixture with one another in isolation from said primary flow of air to form a combined stream, and then directing said combined stream into said primary flow of air for intimate intermixture therewith;
said means forming a plurality of passages through which said fuel and secondary air flow closely adjacent said restriction and which have tapering first portions and flaring second portions downstream of said first portions;
said flaring second portions of said passages having open sides.

54. A carburetor comprising:
a body structure through which a vacuum induced primary flow of air passes;
a throttle valve adjustable to regulate said primary flow of air;
a flow actuated member positioned along the path of said primary flow of air and which is movable by the air to different positions varying the width of a restriction through which the air flows in correspondence with the rate of air flow past said member;
means for directing fuel and secondary air into admixture with one another in isolation from said primary flow of air to form a combined stream, and then directing said combined stream into said primary flow of air for intimate intermixture therewith; and
a second member forming said restriction with said first mentioned member and relative to which said first mentioned member is movable to vary the restriction;
said members having opposed surfaces tapering in a downstream direction to reduced ends and forming between them at least a portion of said restriction;
said means being constructed to introduce said combined stream into said flow of primary air at essentially said reduced downstream ends of said surfaces;
said means forming a plurality of circularly spaced passages near said reduced downstream ends of said surfaces and closely adjacent said restriction and through which said fuel and secondary air flow for intimate intermixture with said primary flow of air;
said passages having first portions tapering to reduced restricted regions and having flaring second portions downstream of said first portions,
said flaring second portions of said passages having open outer sides.

55. A carburetor comprising:
a hollow first member through which a vacuum induced flow of air passes;
a throttle valve contained at least partially within the interior of said first member and operable to regulate said flow of air therethrough;
said first member having a side wall containing at least one opening through which said flow of air passes outwardly from the interior to the exterior of said first member downstream of the throttle valve;
a flow actuated member extending about said hollow first member and forming therewith a restriction at the exterior of said first member through which said air passes after flow through said opening;
said flow actuated member being movable relative to said first member by said flow of air to different positions varying the width of said restriction in correspondence with the rate of air flow through the restriction; and
means for introducing fuel into said flow of air.

56. A carburetor as recited in claim 55, in which said means introduce fuel into said air at essentially the location of said restriction.

57. A carburetor as recited in claim 55, in which said restriction is essentially annular, and said means introduce said fuel into said flow of air adjacent said restriction and in an essentially annular pattern corresponding essentially to that of the restriction.

58. A carburetor as recited in claim 55, in which said hollow first member has a side wall containing said opening, said means including a passage formed within said side wall in isolation from said first mentioned flow of air and through which said fuel flows for delivery into said flow of air at said restriction.

59. A carburetor as recited in claim 55, in which said means include a secondary air valve for admitting secondary air into admixture with said fuel before the fuel is admitted into said first mentioned flow of air, there being means operable by said flow actuated member to vary the setting of said secondary air valve in response to movement of said flow actuated member by air flowing therepast.

60. A carburetor as recited in claim 55, in which said flow actuated member is movable along an axis, said first member and said flow actuated member having opposed surfaces tapering toward said axis in a downstream direction and forming said restriction as a tapering annular restriction between said members, said means being constructed to introduce said fuel premixed with secondary air near the downstream end of said restriction and in an essentially annular pattern corresponding essentially to that of the restriction.

61. A carburetor as recited in claim 60, in which said hollow first member has a side wall containing said opening, said means including a passage formed within said side wall in isolation from said first mentioned flow of air and through which said fuel flows for delivery into said flow of air at said restriction, said means including a secondary air valve for admitting secondary air into admixture with said fuel before the fuel is admitted into said first mentioned flow of air, there being means operable by said flow actuated member to vary the setting of said secondary air valve in response to movement of said flow actuated member by air flowing therepast.

62. A carburetor comprising:
a body structure through which a vacuum induced primary flow of air passes;
a throttle valve adjustable to regulate said primary flow of air;
a flow actuated member positioned along the path of said primary flow of air at a location downstream of said throttle valve and which is movable by said air to different positions varying the width of an essentially annular restriction through which the air flows;
fuel delivery means for directing fuel and secondary air into admixture with one another in isolation from said primary flow of air to form a combined stream, and then directing said combined stream for induction by vacuum into said primary flow of air;
said fuel delivery means including a second valve operable to regulate the flow of secondary air before admixture with the fuel in a manner enriching said combined stream when the flow of secondary air is reduced; and
automatic actuating means operable by said flow actuated member, upon movement thereof in an opening direction increasing the width of said restriction, to progressively close said second valve and thereby enrich said combined stream;
said fuel delivery means being constructed to direct said combined stream of fuel and secondary air into said primary flow of air at a location downstream of said throttle valve and directly adjacent said essentially annular restriction in all positions of said flow actuated member and in a generally annular pattern corresponding generally to that of said essentially annular restriction, to intimately intermix the combined stream of fuel and secondary air with the primary flow of air at essentially the maximum velocity of the primary flow of air as it passes the flow actuated member.

63. A carburetor as recited in claim 62, in which said automatic actuating means include an adjustment for varying the movement of said second valve in response to predetermined movement of said flow actuated member.

64. A carburetor as recited in claim 62, in which said fuel delivery means include means automatically responsive to development of a vacuum condition to increase the flow of secondary air to the fuel.

65. A carburetor as recited in claim 62, in which said fuel delivery means include a third valve controlling the flow of a portion of the secondary air to the fuel, and vacuum actuated means automatically responsive to development of a vacuum condition to move said third valve in an opening direction increasing the flow of secondary air to the fuel.

66. A carburetor as recited in claim 62, in which said fuel delivery means include a third valve controlling the admission of at least a portion of the secondary air to the fuel, vacuum actuated means automatically responsive to development of a vacuum condition downstream of the throttle valve to move said third valve in an opening direction, and thermostatic means operable under cold start conditions to prevent opening movement of said third valve.

67. A carburetor as recited in claim 62, in which said fuel delivery means include a lever mounted for pivotal movement relative to said body structure, a third valve carried at an end of said lever and which is disposed at least partially across an inlet through which secondary air flows, and means responsive to development of a vacuum condition to swing said lever and third valve to a position allowing increased flow through said inlet.

68. A carburetor as recited in claim 62, including thermostatic control means operable to deliver a flow of supplementary air to a location downstream of said throttle valve under cold start conditions and reduce said flow of supplementary air in response to an increase in temperature.

69. A carburetor as recited in claim 62, including means yieldingly resisting movement of said flow actuated member to said different positions by air flowing therepast.

70. A carburetor as recited in claim 62, in which said fuel delivery means include thermostatic control means automatically operable under cold start conditions to restrict the flow of secondary air to the fuel and thereby enrich said combined stream, and automatically operable upon an increase in temperature to admit increased secondary air to the fuel and thereby lean said combined stream.

71. A carburetor as recited in claim 70, including means forming a passage for delivering supplementary fast idle air to a location downstream of said throttle valve, and a third valve actuable by said thermostatic control means to permit increased flow of supplementary air under cold start conditions and to automatically reduce flow of said supplementary air in response to an increase in temperature.

72. A carburetor as recited in claim 62, in which said fuel delivery means form a circular series of openings through which the fuel and secondary air of said combined stream are introduced together into said primary flow of air directly adjacent said essentially annular restriction.

73. A carburetor as recited in claim 72, in which said openings flare to progressively increasing widths as they advance in the direction of flow therethrough.

74. A carburetor as recited in claim 72, in which said openings are at least partially open at radially outer sides thereof facing generally toward said restriction.

75. A carburetor as recited in claim 62, in which said flow actuated member is mounted for movement essentially along a first axis by air flowing therepast, said second valve including a rotary valve element mounted for rotation about a second axis to regulate the flow of said secondary air, said automatic actuating means including an operative connection for converting movement of said flow actuated member along said first axis to rotary movement of said rotary valve element about said second axis.

76. A carburetor as recited in claim 75, in which said connection includes an adjustment for varying the range of rotary movement of said rotary valve element about said second axis for a particular range of movement of said flow actuated member along said first axis.

77. A carburetor as recited in claim 75, in which said connection includes an adjustment for varying the rate of rotary movement of said rotary valve element about said second axis relative to the rate of movement of said flow actuated member along said first axis.

78. A carburetor as recited in claim 75, in which said connection includes a first adjustment for varying the range of rotary movement of said rotary valve element about said second axis for a particular range of movement of said flow actuated member along said first axis, and a second adjustment for varying the rate of rotary movement of said rotary valve element about said second axis relative to the rate of movement of said flow actuated member along said first axis.

79. A carburetor as recited in claim 62, including a second member forming said restriction with said flow actuated member and relative to which said flow actuated member is movable to vary the width of said restriction, said two members having opposed essentially annular surfaces tapering in a downstream direction and defining said restriction therebetween as a variable width tapering annular restriction.

80. A carburetor as recited in claim 79, in which said fuel delivery means direct said intermixed fuel and secondary air of said combined stream into said primary flow of air at essentially the downstream end of said tapering restriction.

81. A carburetor as recited in claim 80, in which said fuel delivery means form a circular series of openings through which the fuel and secondary air of said combined stream are introduced together into said primary flow of air directly adjacent said essentially annular restriction, said openings having first portions tapering in a downstream direction and having second portions therebeyond which flare downstream and are open at radially outer sides thereof facing generally toward the downstream end of said tapering restriction.

82. A carburetor as recited in claim 62, including a diffuser structure containing a passage through which said combined stream is directed between said second valve and the point of admixture of the combined stream with said primary flow of air, said passage having a restricted portion for increasing the velocity of said combined stream and thereby enhancing intimate intermixture of the fuel and secondary air.

83. A carburetor as recited in claim 82, in which said restricted portion of said passage has a side wall with irregularities for diffusing the fuel and secondary air.

84. A carburetor as recited in claim 82, in which said passage has a tapering portion reducing progressively in width toward said restricted portion, and a flaring portion beyond said restricted portion.

85. A carburetor as recited in claim 82, in which said passage has a tapering portion reducing progressively in width toward said restricted portion and a flaring portion beyond said restricted portion, said restricted portion having a side wall with irregularities for diffusing the fuel and secondary air.

86. A carburetor comprising:
a body structure through which a flow of air passes along a path;
a throttle valve adjustable to regulate said flow of air;
a flow actuated member positioned along said path and which is movable by the air in an opening direction progressively increasing the width of a restriction through which the air flows in correspondence with the rate of air flow past said member;
means yieldingly urging said flow actuated member to a closed position preventing air flow through said restriction; and
an operative connection between said throttle valve and said flow actuated member operable in response to opening movement of said throttle valve to move said flow actuated member from said closed position to a partially open position independently of the actuation of said member by air flowing therepast; to enable clearing of a flooded condition;
said member being free, after clearing of the flooded condition, for movement in said opening direction by air flowing therepast independently of said operative connection, and being free for movement farther in said opening direction by air flowing therepast than by said operative connection;
said operative connection including a cylindrical shaft connected to said throttle valve and mounted to turn about an axis disposed essentially transversely of said passage, and pins connected to said flow actuated member, and projecting into recesses in said shaft;
said recesses in the shaft having inner wall surfaces lying essentially in a plane which contains said axis and which is disposed essentially diametrically with respect to said shaft;
said pins having end surfaces which engage said inner wall surfaces of said recesses and which are cammed thereby in a relation displacing said flow actuated member in said opening direction upon rotation of the throttle and shaft about said axis in a direction opening the throttle valve.

87. A carburetor comprising:
a body structure through which a vacuum induced primary flow of air passes;
a throttle valve adjustable to regulate said primary flow of air;
a fuel inlet;
said body structure having a portion with a surface containing a secondary air inlet opening;
means for directing fuel from said fuel inlet, and secondary air which enters said secondary air inlet opening, into admixture with one another in isolation from said primary flow of air to form a combined stream, and then directing said combined stream for induction by vacuum into said primary flow of air;
a lever mounted for pivoting movement relative to said body structure at a location adjacent said surface which contains the secondary air inlet opening and about an axis extending essentially pependicular to said surface;

a valve element carried by said lever at a location offset from said axis and closely adjacent said surface and which, upon pivotal movement of the lever, swings essentially parallel to said surface and transversely across said opening to positions extending different distances across said opening, to thereby vary the effective size of the opening and the rate of flow of secondary air therethrough; and means for pivoting said lever to vary the flow of secondary air into admixture with said fuel;

said means for pivoting the lever including control means responsive to development of a vacuum condition to swing said lever in a direction opening said valve element carried thereby, and thermostatic means operable under cold start conditions to prevent swinging movement of the lever in a direction opening said valve element carried thereby.

* * * * *